United States Patent
Subramanian et al.

(10) Patent No.: US 11,887,041 B2
(45) Date of Patent: Jan. 30, 2024

(54) DELIVERY AT A PRECISE LOCATION

(71) Applicant: QUALCOMM Incorporated, San Diego, CA (US)

(72) Inventors: Sathiyamoorthy Subramanian, Cambridge (GB); Bala Ramasamy, San Marcos, CA (US); Arnold Jason Gum, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/483,591

(22) Filed: Sep. 23, 2021

(65) Prior Publication Data

US 2023/0089726 A1    Mar. 23, 2023

(51) Int. Cl.
*G06Q 10/0833* (2023.01)
*H04W 4/029* (2018.01)
*G06Q 50/30* (2012.01)

(52) U.S. Cl.
CPC ......... *G06Q 10/0833* (2013.01); *G06Q 50/30* (2013.01); *H04W 4/029* (2018.02)

(58) Field of Classification Search
CPC .... G06Q 10/0833; G06Q 50/30; H04W 4/029
USPC ........................................................ 705/330
See application file for complete search history.

(56) References Cited

U.S. PATENT DOCUMENTS

| | | | |
|---|---|---|---|
| 10,997,544 B1 * | 5/2021 | Bar-Zeev | B64F 1/18 |
| 11,361,273 B2 * | 6/2022 | Dearing | G06F 16/29 |
| 2015/0302495 A1 * | 10/2015 | Stuckman | G06Q 30/0609 705/26.35 |
| 2016/0171439 A1 * | 6/2016 | Ladden | G06Q 10/083 705/340 |
| 2017/0147975 A1 * | 5/2017 | Natarajan | G07C 9/00182 |
| 2018/0082598 A1 | 3/2018 | Soundararajan et al. | |
| 2019/0197555 A1 * | 6/2019 | Gupta | G06Q 20/4097 |
| 2020/0288895 A1 | 9/2020 | Bennet et al. | |
| 2021/0019699 A1 * | 1/2021 | Bornski | G05D 1/0022 |

OTHER PUBLICATIONS

The Delivery Drones are coming Published by IEEE (Year: 2020).*
International Search Report and Written Opinion—PCT/US2022/074352—ISA/EPO—dated Oct. 20, 2022.

* cited by examiner

*Primary Examiner* — Zeina Elchanti
(74) *Attorney, Agent, or Firm* — Weaver Austin Villeneuve & Sampson LLP

(57) ABSTRACT

Embodiments herein provide for efficient delivery of a package or other item to a precise delivery location using beacons transmitted by a beaconing device, which are detected by a delivery device and used to guide the delivery device to the precise delivery location. Different types of events may be used as triggering events to trigger the transmission of the beacons, and beacons may be encoded to include instructions and/or information to the delivery device for identifying the precise delivery location. According to some embodiments, the beacons may be encoded based on a code unique to the package delivery and/or recipient.

45 Claims, 12 Drawing Sheets

DELIVERY AT A PRECISE LOCATION

BACKGROUND

1. Field of Disclosure

The present disclosure relates generally to the field of package or other item delivery and more specifically to techniques for using wireless signals to identify a precise delivery location.

2. Description of Related Art

With the increased popularity of purchasing products online, package delivery to homes and businesses has increased commensurately. To meet this increased demand, courier services have implemented measures to streamline package delivery. The use of Global Positioning System (GPS) and/or other Global Navigation Satellite System (GNSS) services along with in-vehicle navigation, for example, can help ensure a package deliverer takes an efficient route to an approximate delivery location such as a building or address. At that point, however, it is often up to the package deliverer to find the precise delivery location (e.g., on a doorstep, by a garage door, etc.). The package deliverer may often rely on notes or comments from the package recipient to make the determination.

BRIEF SUMMARY

Embodiments herein provide for efficient delivery of a package or other item to a precise delivery location using beacons transmitted by a beaconing device, which are detected by a delivery device and used to guide the delivery device to the precise delivery location. Different types of events may be used as triggering events to trigger the transmission of the beacons, and beacons may be encoded to include instructions and/or information to the delivery device for identifying the precise delivery location. According to some embodiments, the beacons may be encoded based on a code unique to the package delivery and/or recipient.

An example method of enabling precise package delivery with a beaconing device, according to this disclosure, may comprise receiving a code associated with a package delivery. The method also may comprise determining a triggering event has occurred, related to the package delivery. The method also may comprise responsive to determining the triggering event has occurred, transmitting wireless beacons with the beaconing device.

An example method of enabling precise package delivery with a delivery device, according to this disclosure, may comprise obtaining a code associated with a package delivery. The method also may comprise receiving, at the delivery device, one or more wireless beacons from a beaconing device. The method also may comprise determining a precise delivery location for the package delivery based at least in part on the wireless beacons.

An example beaconing device for enabling precise package delivery, according to this disclosure, may comprise a transceiver, a memory, one or more processors communicatively coupled with the transceiver and the memory, wherein the one or more processors are configured to receive a code associated with a package delivery. The one or more processors further may be configured to determine a triggering event has occurred, related to the package delivery. The one or more processors further may be configured to responsive to determining the triggering event has occurred, transmitting wireless beacons via the transceiver.

An example delivery device for enabling precise package delivery, according to this disclosure, may comprise a transceiver, a memory, one or more processors communicatively coupled with the transceiver and the memory, wherein the one or more processors are configured to obtain a code associated with a package delivery. The one or more processors further may be configured to receive, via the transceiver, one or more wireless beacons from a beaconing device. The one or more processors further may be configured to determine a precise delivery location for the package delivery based at least in part on the wireless beacons.

An example beaconing device for enabling precise package delivery, according to this disclosure, may comprise means for receiving a code associated with a package delivery, means for determining a triggering event has occurred, related to the package delivery, and means for transmitting wireless beacons with the beaconing device responsive to determining the triggering event has occurred.

An example delivery device for enabling precise package delivery, according to this disclosure, may comprise means for obtaining a code associated with a package delivery, means for receiving one or more wireless beacons from a beaconing device, and means for determining a precise delivery location for the package delivery based at least in part on the wireless beacons.

An example non-transitory computer-readable medium, according to this disclosure, may store instructions for enabling precise package delivery with a beaconing device, the instructions comprising code for, receiving a code associated with a package delivery, determining a triggering event has occurred, related to the package delivery, and responsive to determining the triggering event has occurred, transmitting wireless beacons with the beaconing device.

Another example non-transitory computer-readable medium, according to this disclosure, may store instructions for enabling precise package delivery with a delivery device, the instructions comprising code for obtaining a code associated with a package delivery, receiving, at the delivery device, one or more wireless beacons from a beaconing device, and determining a precise delivery location for the package delivery based at least in part on the wireless beacons.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Like reference symbols in the various drawings indicate like elements, in accordance with certain example implementations.

DETAILED DESCRIPTION

Figure 1:
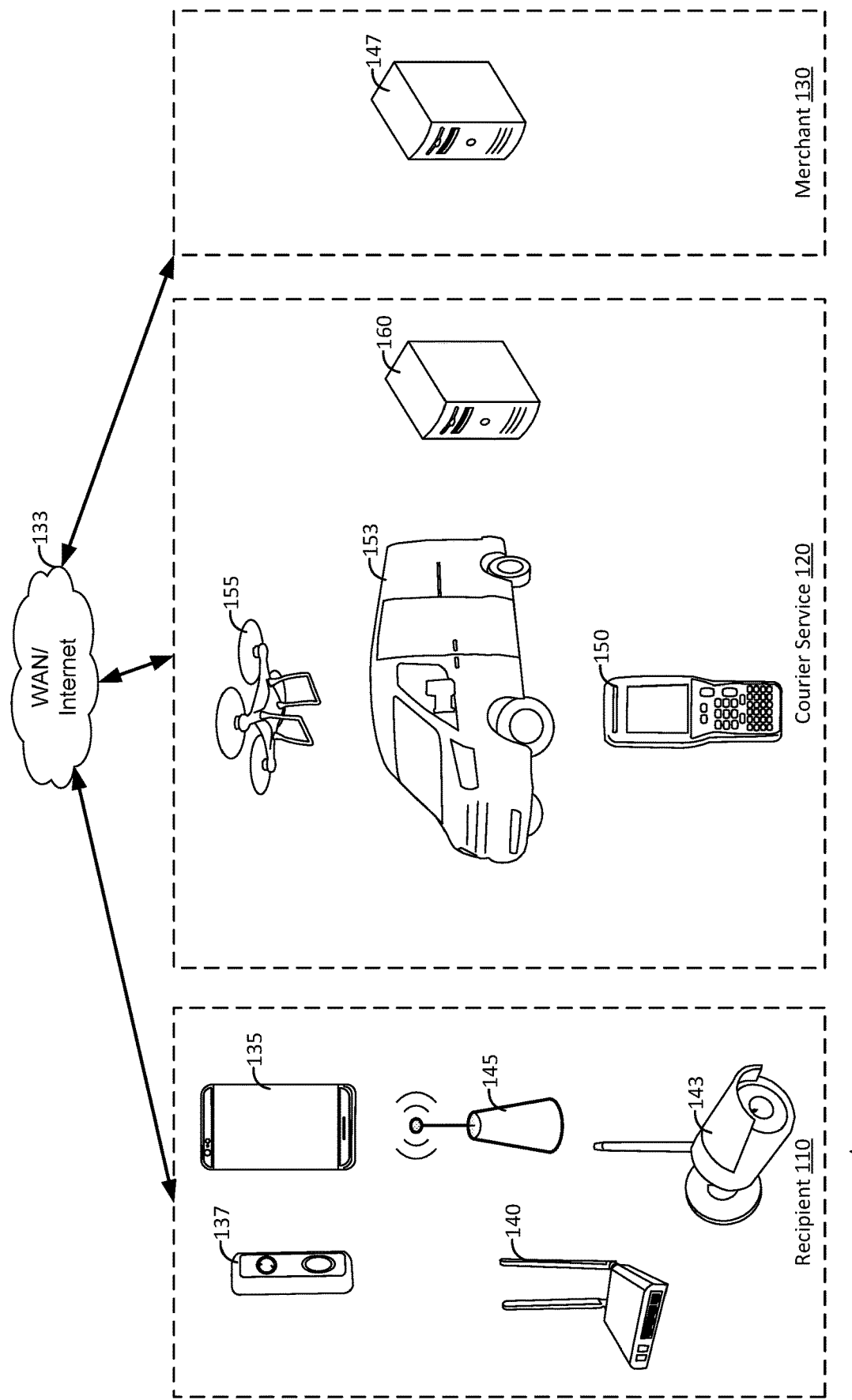
FIG. 1 is a simplified diagram of a delivery service network, according to some embodiments.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, a "beacon" or "RF signal" comprises an electromagnetic wave that transports information through the space between a transmitter (or transmitting device) and a receiver (or receiving device). As noted herein, beacons can be used by a beaconing device to help a delivery device find a precise delivery location. To do so, the delivery device may take measurements of one or more beacons transmitted by the beaconing device. Additionally or alternatively, the delivery device may extract information embedded within the one or more beacons, and/or separate from the beacons, in a manner described in further detail hereafter.

As noted, for package delivery to a recipient's address, a package deliverer may use technologies such as GPS and navigation applications to navigate a delivery vehicle to an approximate location of a recipient's address for package delivery. However, these technologies may not direct the package deliverer to the exact building or address. For example, the package deliverer may be directed to a cul-de-sac with multiple houses, but it may not be readily apparent which house is the recipient's house if the house addresses are not clearly marked. Multi-unit housing (duplexes, apartments, etc.), raise additional concerns for a package deliverer if markings for each unit (e.g., on or near the doors) do not clearly match the delivery address of the package. Further, special delivery instructions (e.g., delivering to a particular door, setting a package behind a gated fence, etc.) may sometimes be confusing to a package deliverer if the recipient does not provide clear details in the special delivery instructions. As such, a package deliverer often may not be able to rely on current technologies to identify a precise location for package delivery. Further, because delivery verification is often provided only by the package deliverer (e.g., who may take a photograph of the delivered package), this may only verify to the courier service and/or recipient that the package was delivered. Except for cases in which a recipient signs for a package, which requires the recipient to be present at the time of delivery, verification that the package was delivered to the correct location is often unavailable.

Embodiments herein address these and other issues by providing wireless beacons with a beaconing device located at or near the precise delivery location to help the package deliverer find the precise delivery location using a delivery device. As described in more detail hereafter, such beaconing may be based on a triggering event, and beacons may be encrypted to help ensure secure delivery of the package. Moreover, beacons can include information related to the delivery, including information from the recipient. According to some embodiments, delivery verification may be provided by a recipient, thereby helping ensure the package gets delivered to the correct precise location.

FIG. 1 is a simplified diagram of a delivery service network 100, according to some embodiments. As illustrated, the delivery service network 100 may comprise various devices owned and/or maintained by a recipient 110, a courier service 120, and a merchant 130. It should be noted that the various devices illustrated are provided simply as examples and are not intended to be exhaustive or limiting. Further, for simplicity, references herein to the recipient 110, courier service 120, and merchant 130, may also refer to one or more of the respective devices illustrated in FIG. 1. As illustrated, the various devices may be communicatively coupled with a Wide Area Network (WAN)/Internet 133. As such, the various devices may communicate with each other via the Internet. That said, the various components may communicate directly with each other (e.g., via direct wireless communication), according to some embodiments additionally, although FIG. 1 illustrates a courier service 120, embodiments herein may apply to any type of service in which items are physically delivered to a recipient. As such, embodiments may apply to any type of package, parcel, and/or letter delivery service.

The devices of the recipient 110 may include a mobile device 135 and/or other electronic devices, such as a doorbell camera 137, Wireless Local Area Network (WLAN) (e.g., Wi-Fi) router 140, security camera 143, and/or proprietary beaconing device 145. The merchant 130 may own, maintain, and/or have access to a merchant server 147 or similar device. The devices of the courier service 120 may comprise a handheld device 150, delivery vehicle 153, drone 155 (or other automated delivery vehicle or device), and a courier service server 160. Devices of the courier service 120 may vary in form and function. Moreover, the courier service 120 may utilize other autonomous delivery devices in addition or as an alternative to drone 155. It can be noted that, depending on desired functionality, the merchant server 147 and/or courier service server 160 may comprise one or more physical and/or virtual servers, which may be located at the premises of the merchant 130 and/or courier service 120, respectively. Additionally or alternatively, the merchant server 147 and/or courier service server 160 may be operated and/or maintained in "the cloud" by one or more physical and/or virtual servers that may be located at one or more geographically diverse locations.

Put briefly, the various devices of FIG. 1 may interact as follows. The recipient 110 (e.g., using the mobile device 135 or other device) may purchase an item from the merchant 130. Although not necessary, the purchase may be made via the WAN/Internet (e.g., over the phone or online). The WAN/Internet 133 comprise any combination of public and/or private communication networks, including the Internet, which may utilize any variety of wireless and/or wired communication technologies. Once the purchase is made, the merchant 130 may then determine when pickup by the courier service 120 may be needed and may notify the courier service 120. In some embodiments, for example, the merchant 130 may notify the courier service 120 via communications from the merchant server 147 to the courier service server 160.

Once the courier service 120 picks up the package from the merchant 130 it may then implement a number of logistical procedures to transport the package from the merchant to the recipient 110. Among other things, the courier service 120 may communicate with one or more of the devices of the recipient 110 (e.g., mobile device 135) to indicate a code that may be used by a beaconing device (e.g., the mobile device 135, WLAN router 140, or proprietary beaconing device 145), to transmit unique beacons to help enable precise package delivery. More particularly, the beaconing device of the recipient 110 may transmit the code in a beacon and/or use the code to formulate a beacon that is received by a delivery device (e.g., handheld device 150, delivery vehicle 153, drone 155) and used to uniquely identify the recipient 110. According to some embodiments, the beaconing device may begin beaconing after receiving a triggering event, such as the courier service 120 notifying the one or more devices of the recipient 110 that the package delivery may occur within a threshold amount of time (e.g., within 10 minutes, 5 minutes, 2 minutes, etc.) and/or a delivery device is within a threshold distance from the delivery location. Moreover, according to some embodiments, the beaconing device may perform ranging and/or provide additional information to the delivery device (e.g., via direct wireless communication) to help guide the delivery device or person using the delivery device to the precise location where the package is to be delivered. Moreover, as previously noted, the recipient 110 can verify that delivery was made at the correct location based on information obtained by the beaconing device and/or other devices (e.g., image and/or video captured by the doorbell camera 137 and/or security camera 143).

Additional details are provided in the various embodiments described hereafter regard to FIGS. 3-12. First, however, FIG. 2 is provided to help illustrate examples of precise delivery locations.

Figure 2:
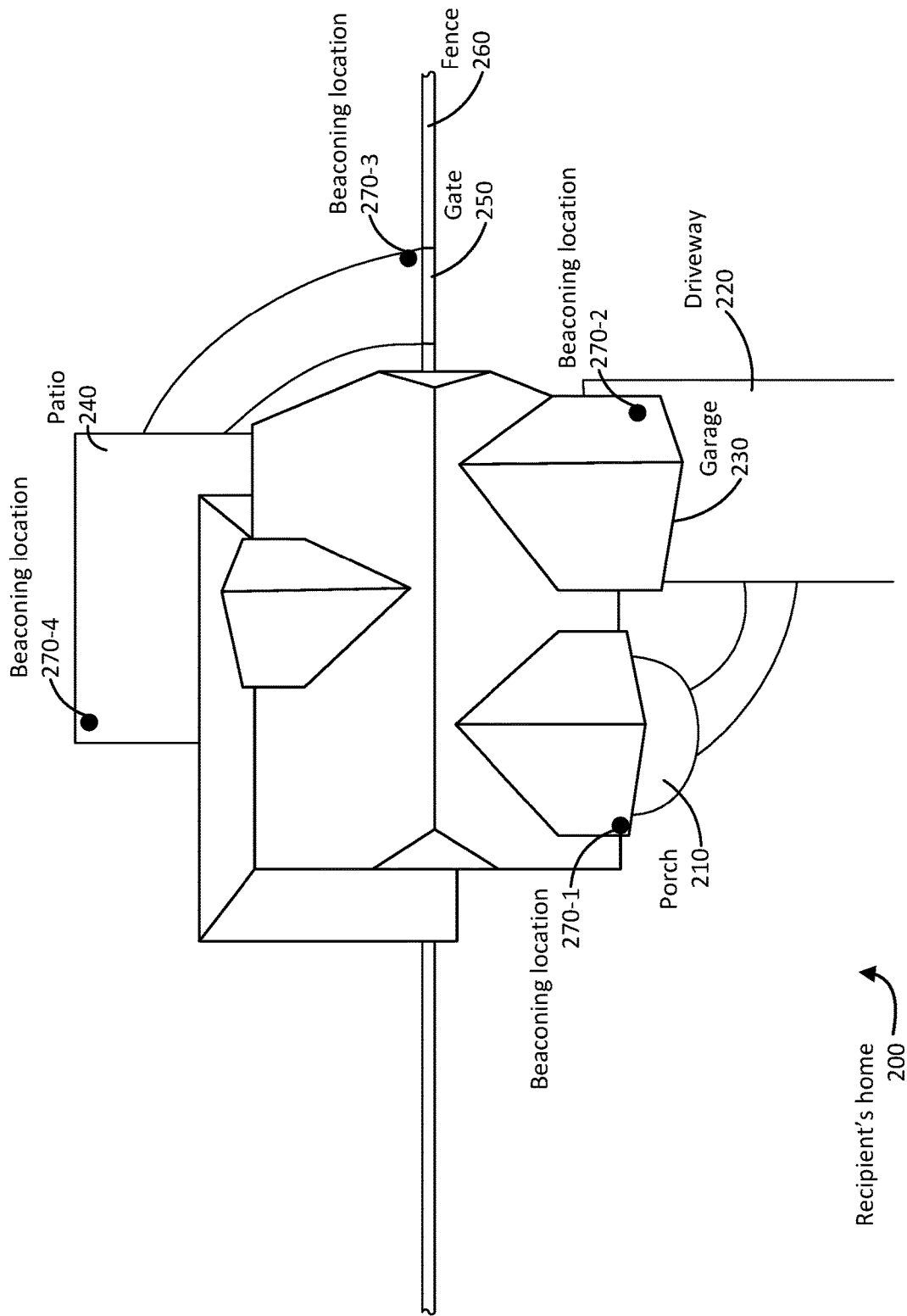
FIG. 2 is an overhead view of an recipient's home, according to an example.

FIG. 2 is an overhead view of an recipient's home 200, according to an example. As used herein, the term "precise delivery location" and variations thereof may refer to a particular space or volume (e.g., a geo-fence) at a delivery address in which the package is to be delivered. For a single-family home, such as the recipient's home 200 illustrated in FIG. 2, this may include the porch 210, driveway 220, garage 230, patio 240, or inside a gate 250 of a fence 260, for example.

Precise delivery locations may vary, of course, depending on the particular delivery location. For multi-family residential units that have multiple doors, such as apartments and duplexes, a precise delivery location may comprise the door of the recipient. For condominiums, townhouses, or the like, a precise delivery location may comprise the recipients building and/or unit. Other precise delivery locations may vary for other types of residential buildings, as well as commercial and industrial buildings/properties.

Traditional package delivery often does not accommodate package delivery or delivery verification at a precise delivery location. For example, traditional package delivery may involve a deliverer of the courier service (e.g., courier service 120) finding the recipient's home 200 by using a map and/or Global Positioning Service (GPS), for example, and leaving the package somewhere on the property, typically on the porch 210 or (e.g., for bigger items) in the driveway 220. For traditional package delivery, these locations, however, are typically of the deliverer's choosing. That said, instructions for the delivery may be written by the recipient and provided to the deliverer, either relayed by the merchant or provided directly by the recipient. These instructions, however, may not always be clear.

By utilizing one or more beaconing devices, embodiments can allow a delivery device that receives the beacons to be guided to the precise delivery location. As illustrated in FIG. 2, for example, a beaconing device may be located at a beaconing location 270-1, 270-2, 270-3, and 270-4 (collectively and generically referred to herein as beaconing locations 270), which may be at or near a precise delivery location. Specifically, in the example of FIG. 2, a first beaconing location 270-1 is near the porch 210, a second beaconing location 270-2 is in the garage 230, a third beaconing location 270-3 is inside the gate 250, and the fourth beaconing location 270-4 is on the porch 240.

Depending on desired functionality, embodiments may guide a delivery device receiving beacons in any of a variety of ways. For example, according to some embodiments in which multiple beaconing devices are used, a beacon may be activated (e.g., in response to a triggering event) at the beaconing location 270 corresponding to the precise delivery location at which the package is to be delivered. In the example in FIG. 2, for example, a beaconing device at the fourth beaconing location 270-4 may transmit beacons to allow a drone 155 to deliver a package on the patio 240, while beaconing devices at the other beaconing locations (270-1, 270-2, and 270-3) do not transmit beacons. Alternatively, for a delivery on the porch 210, a beaconing device at the first beaconing location 270-1 may transmit beacons while beaconing devices at the other beaconing locations (270-2, 270-3, and 270-4) do not transmit beacons.

According to some embodiments, ranging may be performed by a delivery of device and/or between a beaconing device in a delivery device to allow for additional functionality. If a single beaconing devices used, for example, a delivery device may perform one or more Received Signal Strength Indicator (RSSI) measurements, Fine Time Measurement (FTM), and/or Round-Trip Time (RTT) measurements to determine a range between the delivery device and the beaconing device. Once the delivery devices determined to be within a threshold range of the beaconing device, the package may be delivered. Alternatively, if multiple beaconing devices are used, ranging can be performed between the delivery device and the multiple beaconing devices to determine a precise location of the delivery device (e.g., using multilateration or similar positioning techniques). Additionally or alternatively, the beaconing device(s) and/or delivery device may be capable of taking angular measurements of wireless signals, such as angle of arrival (AoA) and/or angle of departure (AoD), in which case the position of the delivery device may be determined using angular measurements (e.g., multiangulation) and/or a combination of range and angular measurements. According to some embodiments, the beaconing device(s) may change from providing omni-directional beaconing to directional beaconing under certain circumstances (e.g., when the delivery device is within a threshold distance).

Depending on desired functionality, a user may calibrate the use of the one or more beaconing devices to determine a precise delivery location. According to some embodiments, for example, a user may use an application executed by a mobile device 135 to activate the one or more beaconing devices. Once the beaconing devices are active, the user may then designate one or more precise delivery locations by moving the mobile device 135 to each precise delivery location. The mobile device can then take measurements (e.g., range and/or angular measurements) of the beacons to determine measurements applicable to each precise delivery location, which can be stored by the mobile device 135, the one or more beaconing devices, and/or provided to the courier service 120 for use during package delivery. During subsequent package delivery, the delivery device can be guided to the precise delivery location by replicating (within a threshold amount) measurements taken during calibration for the respective precise delivery location. According to some embodiments, a similar calibration process may be used to capture images/video to assist in one or more subsequent deliveries by a delivery device. According to some embodiments, to further facilitate delivery at a precise delivery location, a courier service may obtain a map of the recipient's home 200, such as a blueprint or overhead view (e.g., satellite or aerial image and/or video), which may be obtained from the recipient, a satellite or other imaging service, government records, and/or other sources. According to some embodiments, a courier service 120 may allow a recipient 110 to provide a map of the recipient's home 200, and further identify (e.g., on the map) one or more precise delivery locations and/or beaconing locations 270. Subsequently, when communicating with the courier service 120 regarding a precise delivery location, a recipient 110 may be able to select a precise delivery location for package delivery from among the identified precise delivery locations (e.g., using an Internet-based interface, such as a drop-down menu populated using the identified precise delivery locations).

According to some embodiments, a precise delivery location may be designated for each package delivery. That is, different packages may be delivered to different locations. Designation of a location may be provided by the recipient 110. For example, designation may be provided to the merchant 130 by the recipient 110 upon purchase of the item to be delivered or may be provided to a courier service 120 after the recipient 110 receives a package tracking number by the courier service 120. That said, according to some embodiments, a recipient 110 may not need to provide the designation to the merchant 130 or courier service 120 at all. Instead, the recipient 110 can simply select a precise delivery location (e.g., using an app executed by the mobile device 135), and, upon receiving notice of a triggering event, the one or more beaconing devices can transmit beacons in a manner to guide the delivery device to the selected precise delivery location. The designation and/or selection of the precise delivery location may be made using a mobile device 135 (e.g., via an app), which may comprise and/or be communicatively coupled with the one or more beaconing devices; using an Internet-connected device that can relay the selection/designation to the one or more beaconing devices (e.g., via the Internet); and/or utilizing a user interface of the one or more beaconing devices.

Depending on desired functionality, the beaconing device may use beacons utilizing one or more types of wireless technologies. A beaconing device comprising a wireless WLAN router or other WLAN device (e.g., a WLAN-enabled doorbell camera 137 or security camera 143) for example, may utilize WLAN (e.g., Wi-Fi) beacons. A proprietary beaconing device 145 or mobile device 135 may use additional or alternative wireless technologies, including cellular (e.g., Fourth-Generation (4G) Long-Term Evolution (LTE), Fifth-Generation (5G) New Radio (NR), etc.), Bluetooth® (including Bluetooth Low Energy (BLE) and/or Bluetooth Smart), Ultra-Wideband (UWB), IEEE 802.15 and similar technologies (e.g., Zigbee®, Z-wave®, etc.), (e.g. proprietary) wireless technologies. As described in more detail below, according to some embodiments, the beacon may be encrypted (e.g., based on the code provided to the recipient 110 for the package delivery) and/or may include information (e.g., delivery instructions) in addition or as an alternative to a unique identifier to identify the recipient 110. According to some embodiments, the beaconing device may utilize wireless technology for direct two-way communications (e.g., in addition to beaconing) with the delivery device. This may be the same or different than the communication technology used to communicate with the WAN/Internet 133, which the beaconing and delivery devices may use to communicate indirectly with each other and/or other systems/devices (e.g., courier service server 160, merchant server 147, etc.). That said, two-way communications between the beaconing device and the delivery device may not necessarily be limited to indirect communications via the Internet or direct communications using the same wireless technology used for beaconing. According to some embodiments, the beaconing device and delivery device may engage in communication (including two-way communication) using a wireless technology different than the wireless technology used to transmit the beacons. Side-link via 5G wireless technology may be used for direct communication between the beaconing and delivery devices, for example, in cases where the beaconing device may transmit beacons using Bluetooth and/or UWB.

Figure 3:
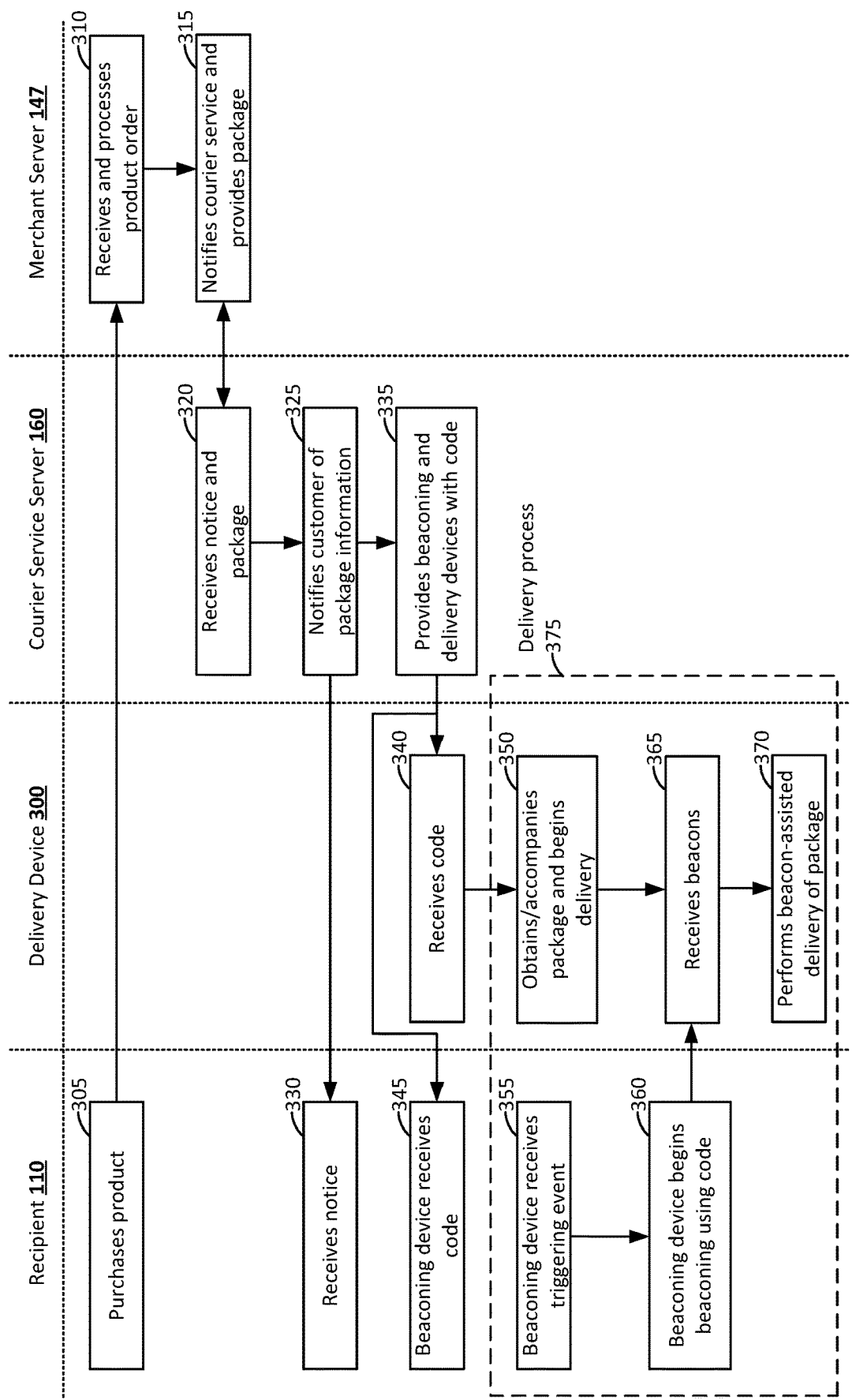
FIG. 3 is a swim lane diagram illustrating interaction between various entities to perform a method of package delivery in accordance with some embodiments herein.

FIG. 3 is a swim lane diagram illustrating interaction between various entities to perform a method of package delivery in accordance with some embodiments herein. As indicated in FIG. 3, the entities comprise the recipient 110, delivery device 300, courier service server 160, and merchant server 147. As previously indicated, a delivery device 300 may comprise a handheld device 150, delivery vehicle 153, drone 155, or other vehicle(s) and/or device(s) used by a courier service 120 to deliver a package to a recipient 110 and capable of receiving beacons from a beaconing device of the recipient 110. The recipient 110 may refer to a customer of the merchant, as well as a beaconing device and (optionally) a device used to purchase the product for delivery. Such devices of the recipient 110 may include, for example, devices illustrated in FIG. 1. Further, although a courier service server 160 and merchant server 147 are listed as distinct entities in FIG. 3, alternative embodiments may employ multiple and/or alternative servers and/or devices to provide equivalent functionality to the courier service server 160 and merchant server 147 illustrated in FIG. 3. Communication between the various entities may be made via the WAN/Internet 133, as illustrated in FIG. 1, although communication between the beaconing device(s) of the recipient 110 and delivery device 300 may be made via direct wireless communications, as previously noted.

The method illustrated in FIG. 3 may begin with the functionality at block 305, where the recipient 110 purchases a product from the merchant. The purchase may be made online or over the phone, for example. Online purchases may be made via a website, which may be communicatively coupled with the merchant server 147. Phone purchases may be made via a call center communicatively coupled with the merchant server 147. In any case, the merchant server 147 receives and processes the product order, as indicated at block 310. In some embodiments, the recipient 110 (as a customer of the merchant 130) may provide instructions for package delivery, such as an indication of a precise delivery location for the package containing the purchased item. In such embodiments, the merchant server 147 may relay these instructions to the courier service 120 as part of the functionality at block 315.

At block 315, the merchant server 147 notifies the courier service and provides details regarding the package to be delivered. This functionality may be performed as part of the standard procedures performed by the merchant 130 for processing product purchases. For example, once the product is packaged, the package may be weighed, and the weight and/or other information of the package can be provided to the courier service 120. At block 320, the courier service server 160 receives the notice and the courier service 120 physically obtains the package.

At block 325, the courier service server 160 notifies the customer of the package information. This functionality may be performed as part of the standard procedures performed by the courier service 120 for processing a package for delivery. The notification is received by the recipient 110 at block 330. This notification may comprise an email notification, telephone call, and/or other communication by the courier service 120 to communicate package and deliver information. This can include, for example, an expected delivery date and/or time, as well as a tracking number.

Additionally, the courier service server 160 may also provide beaconing and delivery devices with a code for delivery, as shown at block 335. In embodiments in which delivery instructions are provided to the courier service 120 (e.g., relayed by the merchant 130), the courier service server 160 can relay the delivery instructions to a delivery device along with the code. As noted, the code may be unique to the recipient 110. And because it may be used to generate beacons, it may be used by a delivery device 300 to identify the recipient 110 for package delivery. This code is received by the delivery device 300 at block 340 and received by the beaconing device of the recipient 110 at block 345.

The code may be generated in any of a variety of ways, depending on desired functionality. For example, according to some embodiments, the code may be based on a password provided to the courier service 120 by the recipient 110 as a response to receiving the notice at block 330. Additionally or alternatively, the recipient 110 may provide the password to the merchant 130 (e.g., upon purchasing the product at block 305), and the merchant 130 can relay the password to the courier service 120 (e.g., as part of the providing the notification and package to the courier service at blocks 315 and 320). Additionally or alternatively, the code may comprise a code unique to the recipient 110 and/or unique to the package delivery, which may be generated by the courier service 120 or by the merchant server 130 (which may then provide the code to the courier service 120). To enable the delivery device 300 to identify the correct beacons of the recipient 110, a beaconing device can use the code to generate beacons by including the code in the beacons and/or by encrypting the beacons based on the code. In the latter case, encryption can help prevent spoofing of beacons by other devices to help ensure delivery to the correct precise delivery location. Beacons including encrypted information may further include information regarding the precise delivery location (e.g., written instructions by the recipient 110 and/or a generic/predetermined location selected by the recipient 110).

In some embodiments, a beaconing device of the recipient 110 may provide capability information to the courier service server 160 (e.g., in response to receiving the code at block 345, or via separate communication), which may be relayed to the delivery device 300 and/or used to configure the delivery device 300 to receive beacons (and optional other communication) from the beaconing device. This may include, for example, information regarding aspects of the beacons (and optional other communication) to be transmitted by the beaconing device, such as wireless technology (4G, 5G, Bluetooth, etc.), frequency band(s), timing information, and the like. This capability information may be relayed to the delivery device 300 via the Internet and/or other communication means, prior to the delivery of the package to the recipient 110.

As illustrated by block 350, the delivery device 300 may obtain/accompany the package and begins delivery. As noted, delivery may be made by the delivery device 300 via automated means (e.g., drone 155 or another autonomous vehicle). Alternatively, the delivery may be made by a human deliverer that uses the delivery device (e.g., delivery vehicle 153 and/or handheld device 150) to aid in the delivery of the package to the precise delivery location.

At block 355, the beaconing device receives a triggering event and, responsive to the triggering event, begins beaconing using the code to generate beacons, as illustrated at block 360. Depending on desired functionality, the triggering event may comprise any of a variety of events used by beaconing device to initiate the beaconing (transmittal beacons) to enable the delivery device 300 to deliver the package at the precise delivery location. As previously noted, this may include the delivery device 300 arriving within a threshold distance of the precise delivery location and/or expected delivery to occur within a threshold amount of time. Notification of these distance/time triggers a be provided to a beaconing device by the courier service server 160 via the Internet, or by the delivery device 300 itself. In the latter case, the delivery device 300 may send this information via indirect means (e.g., via the Internet) and/or via direct wireless communication. According to some embodiments, the receiving of the code by the beaconing device (at block 345) may itself comprise a triggering event Other triggering events may be based on other input. Triggers can be based on, for example, information provided by the courier service 120 (e.g., the courier service server 160 and/or delivery device 300), such as and expected time of day for the package delivery. Additionally or alternatively, a beaconing device may transmit beacons at a first frequency (e.g., based on an expected day and/or time of day of delivery), and a delivery device 300, upon detecting the beacons, may send the beaconing device (via direct and/or indirect communication means) an indication that a beacon has been detected, in which case the beaconing device may then respond by increasing the frequency of beacons and/or transmitting beacons having specific delivery instructions.

According to some embodiments, triggering events may be based on sensor input. For example, because recipient devices may include a doorbell camera 137 and/or security camera 143, a triggering event may comprise a camera detecting movement, identifying a vehicle, and/or identifying a delivery vehicle 153 or drone 155 specific to the courier service 120. This information can be relayed to a beaconing device (e.g., if separate from the camera), which may then begin beaconing. Additionally or alternatively, wireless devices may be used to perform RF sensing (e.g., imaging radar) that may identify movement and/or objects in a manner similar to a camera and may therefore be used in a manner similar to a camera to identify a triggering event.

Once the beaconing device begins beaconing at block 360, the delivery device 300 may then receive the beacons, as indicated at block 365. Using ranging and/or other techniques, as described herein, the delivery device 300 may then perform beacon-assisted delivery of the package, as indicated at block 370. According to some embodiments, this delivery may comprise verification by the recipient 110 of delivery of the package in the precise delivery location. The delivery process 375, including the use of beacons to deliver the package at the precise delivery location and verification of proper package delivery, is described in more detail hereafter with regard to FIGS. 4-8, which provide examples of different delivery processes.

Figure 4:
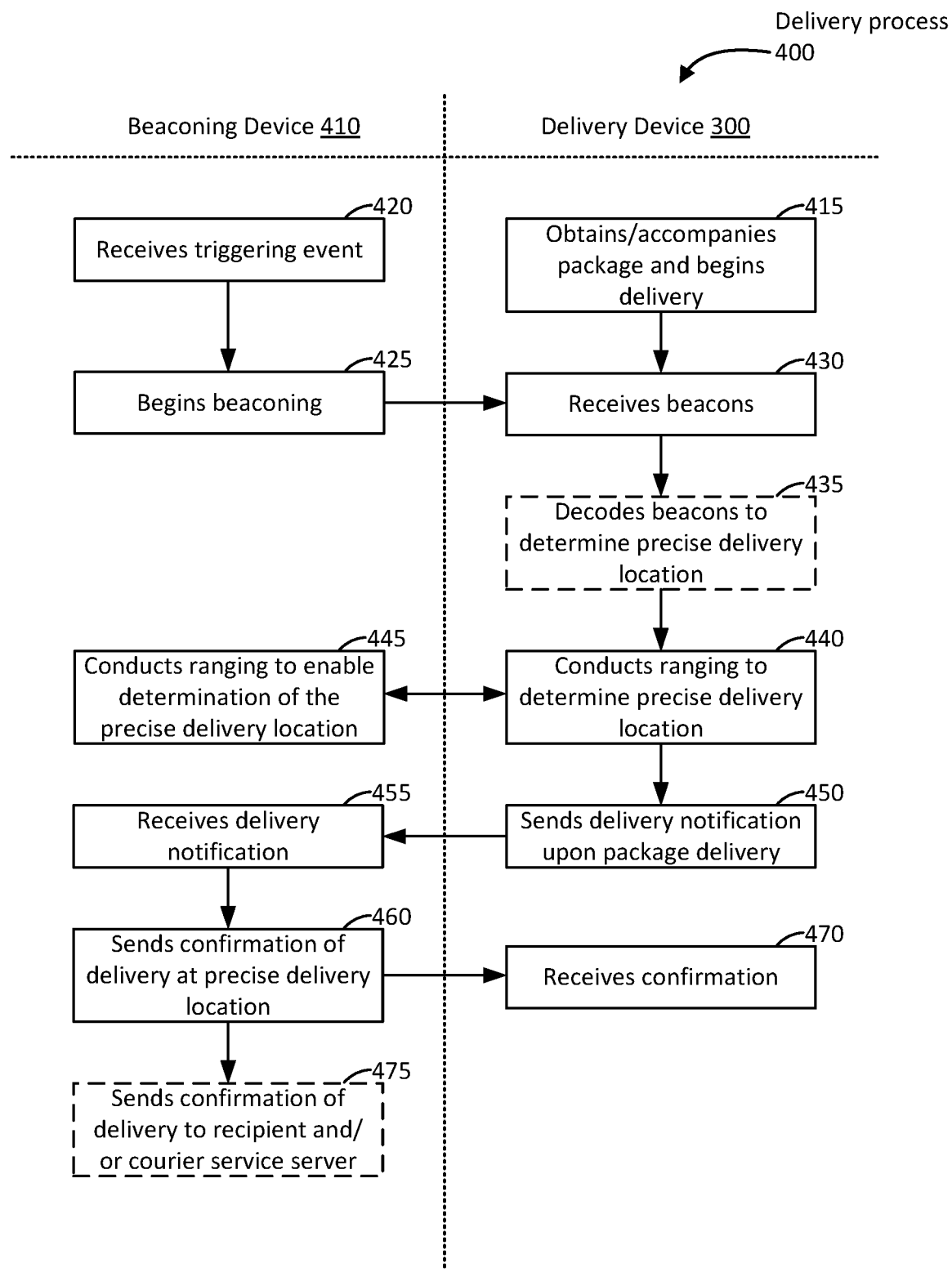
FIGS. 4-8 are swim-lane diagrams of different delivery processes, according to some embodiments.

FIG. 4 is a swim lane diagram illustrating a delivery process 400 according to a first embodiment. Here, the delivery process 400 illustrates functionality performed by a beaconing device 410 and delivery device 300, which may respectively correspond with beaconing devices and delivery devices as previously described with regard to FIGS. 1-3. The functions illustrated in blocks having dashed lines illustrate optional functionality.

At block 415, the delivery device 300 obtains and/or accompanies the package and begins delivery. For its part, the beaconing device 410 may receive a triggering event, at block 420, and begin beaconing at block 425. At block 430, the delivery device receives the beacons. The functionality of blocks 415-430 may generally echo the corresponding functions illustrated in blocks 350-365 of FIG. 3.

As shown at block 435, the delivery process 400 may optionally comprise the delivery device 300 decoding beacons to determine a precise delivery location. As noted in the previously-described embodiments, beacons may include information unique to a particular recipient 110 and/or a particular package delivery. As such, beacons may include information regarding a precise delivery location. This may include, for example, an indication of a predetermined precise delivery location and/or instructions from the recipient 110. According to some embodiments, beacons may further include other information helpful to identify the precise delivery location. According to some embodiments, this can include an indication of a position of the beaconing device 410 relative to the precise delivery location. For example, in reference to the recipient's home 200 of FIG. 2, if the precise delivery location is on the patio 240 a beaconing device at the fourth beaconing location 270-4 may indicate that it is located on the patio 240. Whereas, if the precise delivery location is on the porch 210, a beaconing device at the first beaconing location 270-1 may indicate it is near the porch, inside the front door of the recipient's home 200. Alternatively, indications may include an indication in terms of absolute coordinates (e.g., north, south, east, west), which may be provided in terms of an absolute coordinate system (e.g., East North Up (ENU), latitude/longitude, etc.). According to some embodiments, the information decoded at block 435 may include additional or alternative information for enabling delivery at the precise delivery location. This can include, for example an RF fingerprint and/or RF measurements that may be measured by the delivery device 300 at and/or near the precise delivery location.

According to some embodiments, real-time instructions may be provided via the beacons and/or other communication between a beaconing device 410 and a delivery device 300. That is, a beaconing device 410 capable of obtaining real-time sensor input may further provide real-time instructions to a deliverer/delivery vehicle as it approaches the precise delivery location. As an example, a beaconing device 410 having video/image capability (or having access to live video/image captures taken from cameras) may be capable of identifying the drone in the video/image and provide real-time instructions to a drone 155 for delivering a package to the precise delivery location (e.g., the patio 240). It may also record this video/image and/or send the video/image to a user to confirm delivery of the package. According to some embodiments, a link to the video (which may be stored in the cloud) may be provided to the user, to save bandwidth.

Further, according to the delivery process 400, the delivery device 300 and beaconing device 410 conduct ranging to respectively determine the precise delivery location and enable the determination, as shown at blocks 440 and 445. As previously noted, ranging may include performing FTM, RSSI, and/or RTT measurements. This ranging information may be used, for example, in conjunction with instructions and/or other information regarding the precise delivery location, to enable the delivery device 300 (and/or deliverer using the delivery device 300) to identify the precise delivery location.

At block 450, the delivery device 300 may then send a delivery notification upon package delivery, which is received by the beaconing device 410 at block 455. According to some embodiments (including the delivery process 400), this may trigger a delivery verification process by the beaconing device 410 and/or other devices of the recipient 110. As described in subsequent embodiments (e.g., with respect to FIGS. 5-8), different embodiments may utilize different techniques for verifying precise delivery location, including using one or more pictures of the delivered package provided by the delivery device 300, information from one or more sensors (e.g., camera images) of the recipient 110, and/or user input from the recipient (e.g., viewing a picture to confirm delivery at the precise delivery location). Upon receiving the delivery notification at block 455 and (optionally) verifying or receiving verification of delivery at the precise delivery location, the beaconing device may then stop beaconing and, at block 460, send confirmation of the delivery to the precise delivery location to the delivery device 300, which receives the confirmation at block 470. Optionally, the beaconing device 410 may send additional confirmations to the recipient 110 (e.g., via email, text, etc.) and/or to the courier service server 160.

Embodiments may employ different functions in cases where a delivery does not occur at the precise delivery location. According to some embodiments, a beaconing device may indicate the failure of delivery to the precise delivery location (e.g., instead of providing confirmation at block 470), and (optionally) provide instructions for delivery to the precise delivery location. According to some embodiments, the beaconing device 410 and/or delivery device 300 may notify a user (e.g., via a user device) of failure. Optionally, the user may have an ability to provide instructions and/or other input to the delivery device 300 (and/or human user of the delivery device 300, via the delivery device) regarding the precise delivery location, rescheduling delivery, or the like.

According to some embodiments, a delivery process (e.g., delivery process 400) may accommodate delivery to one or more alternative delivery locations under certain circumstances. Such circumstances may include, for example, environment factors such as wind and/or rain. These factors may be dependent on the type of package (perishable, water sensitive, breakable, etc.). According to such embodiments, a delivery device may be able to communicate to a user device to indicate triggering circumstances and delivery to an alternate location. According to some embodiments, delivery to an alternate location may be automatic. Alternatively, the delivery device may send an indication to a user device of a proposed delivery to an alternative location, allowing the user to respond (e.g., indicating acceptance, specifying an alternative location, or rescheduling delivery). According to some embodiments, the user may be given a window of time within which to provide a response. If no response is provided within the window, the delivery device may take a predetermined action (e.g., rescheduling delivery, delivery to a predetermined alternative delivery location, etc.).

Figure 5:
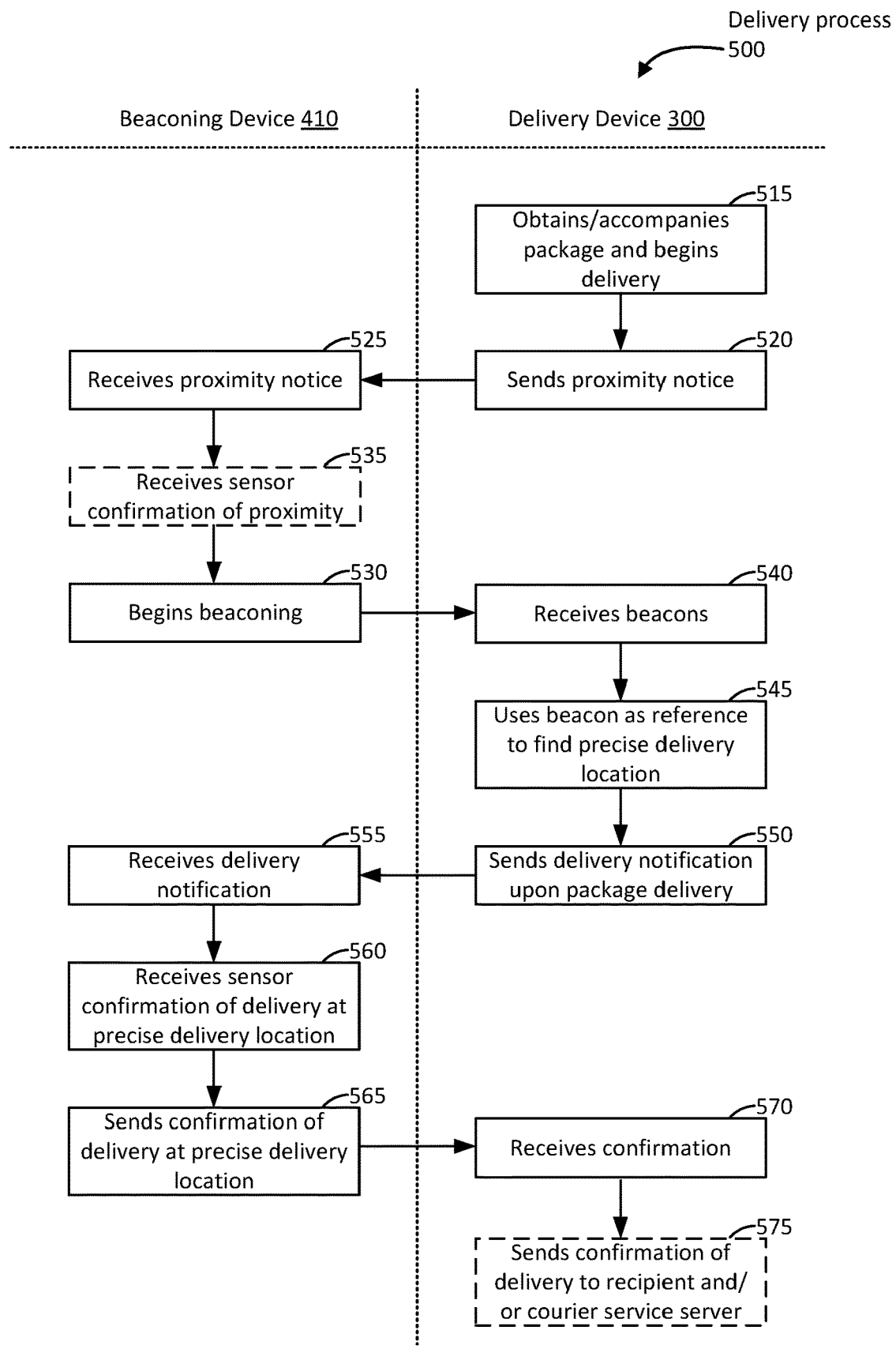

FIG. 5 is a swim lane diagram illustrating a delivery process 500 according to a second embodiment. Similar to the delivery process 400 of FIG. 4, the delivery process 500 illustrates functionality performed by a beaconing device 410 and delivery device 300, which may respectively correspond with beaconing devices and delivery devices as previously described with regard to FIGS. 1-3. Again, the functions illustrated in blocks having dashed lines illustrate optional functionality.

Similar to the delivery process 400 of FIG. 4, the delivery process 500 may begin by the delivery device 300 obtaining/accompanying the package and beginning delivery, as indicated at block 515. Here, however, the delivery device 300 may send a proximity notice 525. This proximity notice may be triggered, for example, by the delivery device 300 entering within a threshold distance of the delivery location (e.g., either the precise delivery location, or simply the delivery address). Depending on desired functionality, the proximity notice sent at block 520 may be sent via indirect communications (e.g., the Internet) and/or direct communication (Wi-Fi, 5G, etc.).

At block 525, beaconing device 410 receives the proximity notice. According to some embodiments, the proximity notice may comprise a triggering event. Thus, the beaconing device 410 may then begin beaconing, as indicated at block 530. However, as indicated at block 535 in FIG. 5, some embodiments may enable the beaconing device 410 to optionally receive sensor confirmation of the proximity of the delivery device 300 before beaconing. In some embodiments, this sensor confirmation may comprise receipt of direct communications from the delivery device 300 (e.g., the proximity notice received at 525 and/or a separate communication). Additionally or alternatively, as previously noted, cameras may be used at the delivery address (e.g., doorbell camera 137 and/or security camera 143), and/or wireless devices may employ RF sensing, to detect movement and/or identify an object (e.g., a human deliverer, delivery vehicle 153, drone 155, etc.). This additional information can be used to confirm proximity of the delivery device 300 prior to the beaconing device 410 beginning beaconing at block 530.

Once the beaconing device 410 begins beaconing, the delivery device 300 may then receive the beacons, at block 540, and use the beacons as a reference to find the precise delivery location (e.g., as indicated at block 545). As previously noted, the beacons may include delivery instructions and/or other information that can be used to determine the precise delivery location. Additionally or alternatively, such instructions and/or information may be conveyed via the courier service 120, which may receive this information from the recipient 110 and/or merchant 130. Moreover, as noted, the delivery device 300 may use ranging and/or angular measurements of the beacons to find the precise delivery location.

Upon delivering the package, the delivery device 300 then sends a delivery notification, as indicated at block 550, which is then received by the beaconing device 410, as indicated at block 555. According to the delivery process 500, the beaconing device 410 then receives sensor confirmation of delivery to the precise location. As noted, this may comprise a camera or RF sensor sensing movement (e.g., a human deliverer and/or delivery device 300) and/or objects (e.g., a human deliverer, delivery device 300, and/or package) at or near the precise delivery location to confirm delivery to the precise delivery location. According to some embodiments, sensor confirmation may further include utilizing wireless technology at the precise delivery location to scan and read identifying information from a radio frequency identifier (RFID) chip and/or similar wireless tag located in or on the package. Additionally or alternatively, identifying information may be obtained by a visual sensor (e.g., a camera) by scanning a barcode or Quick Response (QR) code on the package. According to some embodiments, identifying information may include, for example, and order number of the item in the package, an identifier of the merchant, a tracking number for the package, and identification of the package contents, or the like.

After receiving the sensor confirmation of the delivery, the beaconing device 410 may then send confirmation of the delivery at the precise delivery location to the delivery device 300, as shown at block 565, the receipt of which is shown at block 570. According to some embodiments, this confirmation may be immediate (within seconds of the delivery device 300 sending the delivery notification at block 550), to allow the delivery device 300 to confirm delivery to the correct location. For example, if the beaconing device 410 is unable to receive sensor confirmation of delivery of the package at the precise delivery location, the beaconing device 410 may send an error to the delivery device 300, which the delivery device may then use to re-attempt delivery (or notify a human deliverer to reattempt the delivery). Immediate (or near immediate) receipt of an error (e.g., within 1 second, 5 seconds, 10 seconds, or 20 seconds) may allow the reattempt of the delivery without causing much delay to the overall delivery process. According to some embodiments, sensor information can be used to determine where and unsuccessful delivery was made and/or provide, to the delivery device 300, additional instructions (e.g., directions to the precise delivery location relative to the location at which the package was delivered) to help facilitate successful delivery.

After receiving the confirmation at block 570, the delivery device 300 may then (optionally) send confirmation of the delivery to the recipient 110 (e.g., via text, email, etc.) and/or courier service server 160, as indicated at block 575. This is in contrast to the functionality of the first embodiment of a delivery process 400 and FIG. 4, in which a similar confirmation was provided by the beaconing device. Thus, depending on desired functionality, either or both the delivery device 300 or beaconing device 410 may send confirmation of delivery (which may be verified by the beaconing device 410) to the recipient 110 and/or courier service 120. Moreover, according to some embodiments, a similar confirmation may be provided to merchant 130, if desired.

Figure 6:
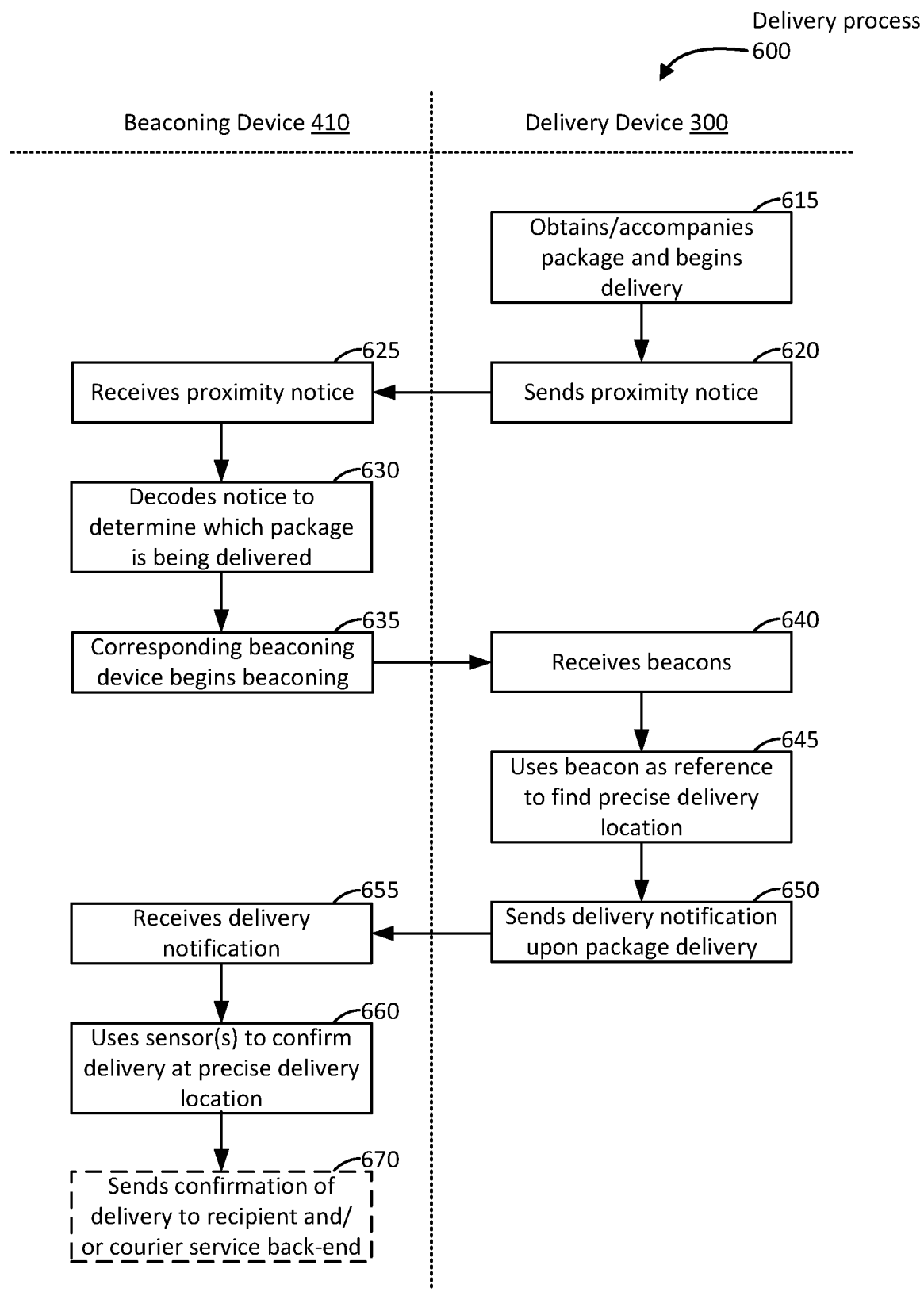

FIG. 6 is a swim lane diagram illustrating a delivery process 600 according to a third embodiment. Similar to the delivery processes 400 and 500 of FIGS. 4 and 5, the delivery process 600 illustrates functionality performed by a beaconing device 410 and delivery device 300, which may respectively correspond with beaconing devices and delivery devices as previously described with regard to FIGS. 1-3. The functions illustrated in blocks having dashed lines illustrate optional functionality.

The functionality at blocks 615-625 may be similar to corresponding blocks 515-525 of FIG. 5, as described previously. Here, however, the process 600 includes an additional function at block 630, where the beaconing device 410 decodes the proximity notice (received at block 625) to determine which package is being delivered. That is, according to some embodiments, a proximity notice provides by a courier service 120 may include information regarding the package for delivery. In embodiments in which the proximity notice is broadcast by delivery device 300, the beaconing device 410 may utilize a previously-received code (e.g., unique to the package delivery, as previously described) to decode the notice and determine which package is being delivered. Additionally or alternatively, the beaconing device 410 may receive the proximity notice via the Internet or other indirect means.

At block 635, the corresponding beaconing device may begin beaconing, enabling delivery to the corresponding precise delivery location. In the example of FIG. 2, for instance, beaconing devices at all four beaconing locations 270 may receive the proximity notice at block 625 and decode the notice to determine where the package is being delivered. If the package is to be delivered on the patio for 240 via drone 155, for example, the corresponding beaconing device located at the fourth beaconing location 270-4 may begin beaconing. Alternatively, if the device is to be delivered inside the gate 250, a beaconing device at the third beaconing location 270-3 may begin beaconing. Alternatively, an intermediary device (e.g., a mobile device 135, hub, or other device in communication with one or more beaconing devices) may receive the proximity notice at block 625 (e.g., via the Internet), decode the notice at block 630, and activate the corresponding beaconing device 410 to begin beaconing at block 635.

The functionality of the delivery device 300 and beaconing device 410 at blocks 640-655 of the delivery process 600 may be similar to corresponding blocks 540-555, described previously. The functionality block 660 comprises the beaconing device 410 using one or more sensors to confirm delivery to the precise delivery location. This functionality, too, may be similar to the corresponding functionality in FIG. 5 (at block 560). The functionality at block 660, however, highlights a slight distinction. That is, rather than receiving sensor confirmation (as was done at block 560 in FIG. 5), the beaconing device 410 may activate a sensor to obtain data confirming the delivery to the precise livery location. That is, the beaconing device 410 may "pull" confirmation data from a sensor, rather than passively receiving the data (e.g., the sensor "pushing" the confirmation data) from the sensor. That said, depending on desired functionality, embodiments may use any combination of push and/or pull communication between the beaconing device 410 and one or more sensors.

At block 670, similar to the functionality at block 475 of FIG. 4, the delivery process 600 may comprise the beaconing device 410 sending confirmation to the recipient 110 and/or courier service 120 of delivery at the precise delivery location.

Figure 7:
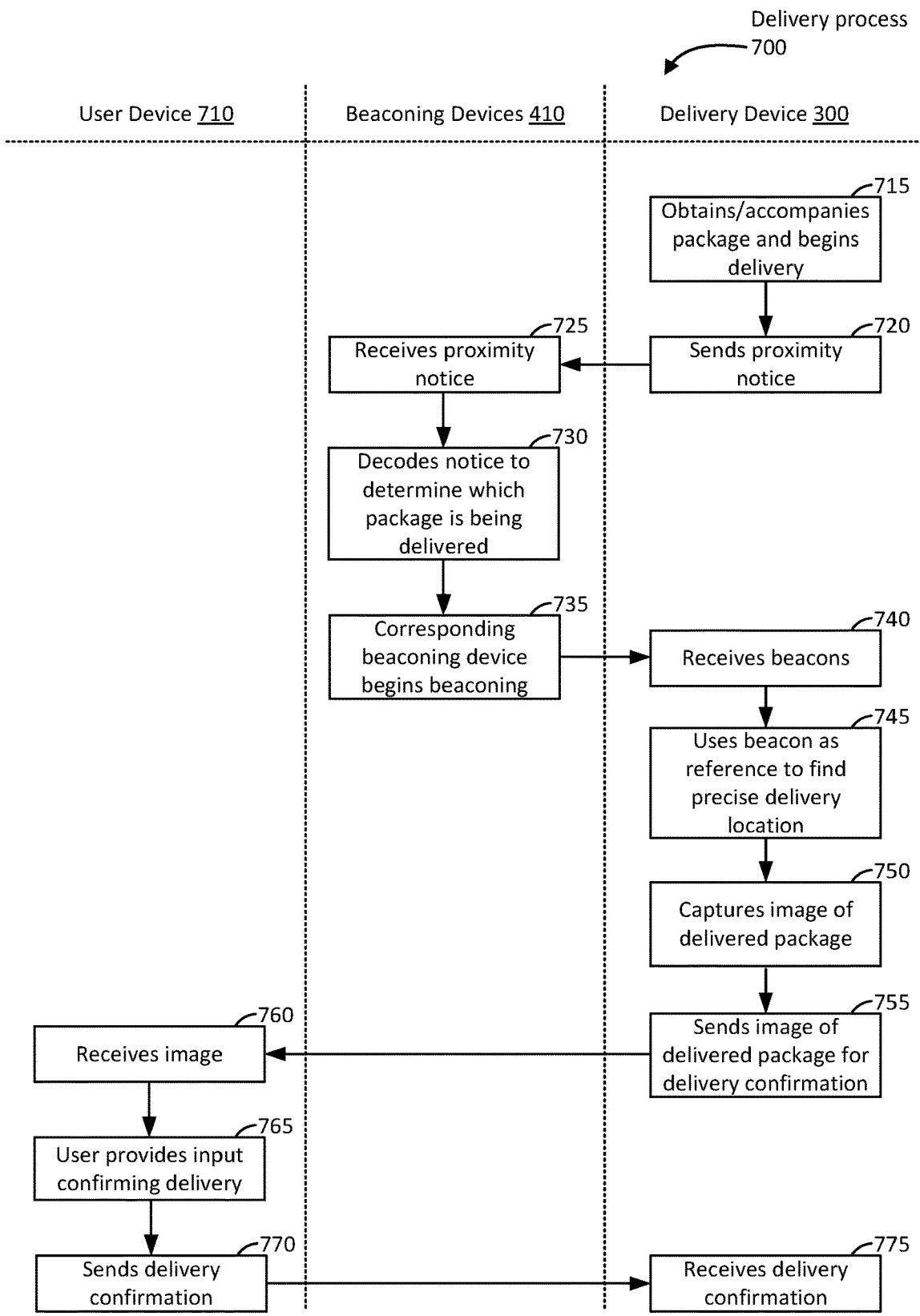

FIG. 7 is a swim lane diagram illustrating a delivery process 700 according to a fourth embodiment. Similar to the delivery processes of FIGS. 4-6, the delivery process 700 illustrates functionality performed by a beaconing device 410 and delivery device 300, which may respectively correspond with beaconing devices and delivery devices as previously described with regard to FIGS. 1-3. The delivery process 700 of FIG. 7, however, also includes the use of a user device 710 that, as described hereafter, is used to receive user verification of delivery at the precise delivery location. The user device 710 may comprise any electronic device capable of being used by the recipient 110 to perform the verification described hereafter. This can include, for example, a computer, mobile phone (e.g., mobile device 135), or other device with the display capable of showing an image of the delivered package. Additionally, the embodiment illustrated in FIG. 7, in contrast to previous embodiments, explicitly includes a plurality of beaconing devices 410. That said, alternative embodiments may utilize a single beaconing device 410, if so desired.

The functionality at blocks 715-745 may be similar to the functionality at corresponding blocks 615-645 of FIG. 6, as previously described. Here, however, once beacons have been used by the delivery device 300 to find the precise delivery location, the delivery device 300 may capture (or be used by a human deliverer to capture) an image of the delivered package, as shown at block 750, which may then be sent by the delivery device 300 to the user device 710, as indicated at blocks 755 and 760. Depending on desired functionality, the user device 710 may receive the image via email, text, and/or some other means. Moreover, depending on desired functionality, the user device 710 may prompt the user to verify or confirm that delivery has been made to the proper precise delivery location. Using a user interface (e.g., touch screen, keypad, keyboard, etc.) the user may then provide input at the user device 710 to confirm the delivery at block 765. Upon receipt of the user input, the user device 710 may then send a delivery confirmation at block 770, which is received by the delivery device at block 775. Communication between the user device 710 and the delivered device 300 may be via indirect means (e.g., the Internet). Alternatively, communication may be made via direct means (e.g., RF communication) if the user device 710 is at or near the precise delivery location.

Figure 8:
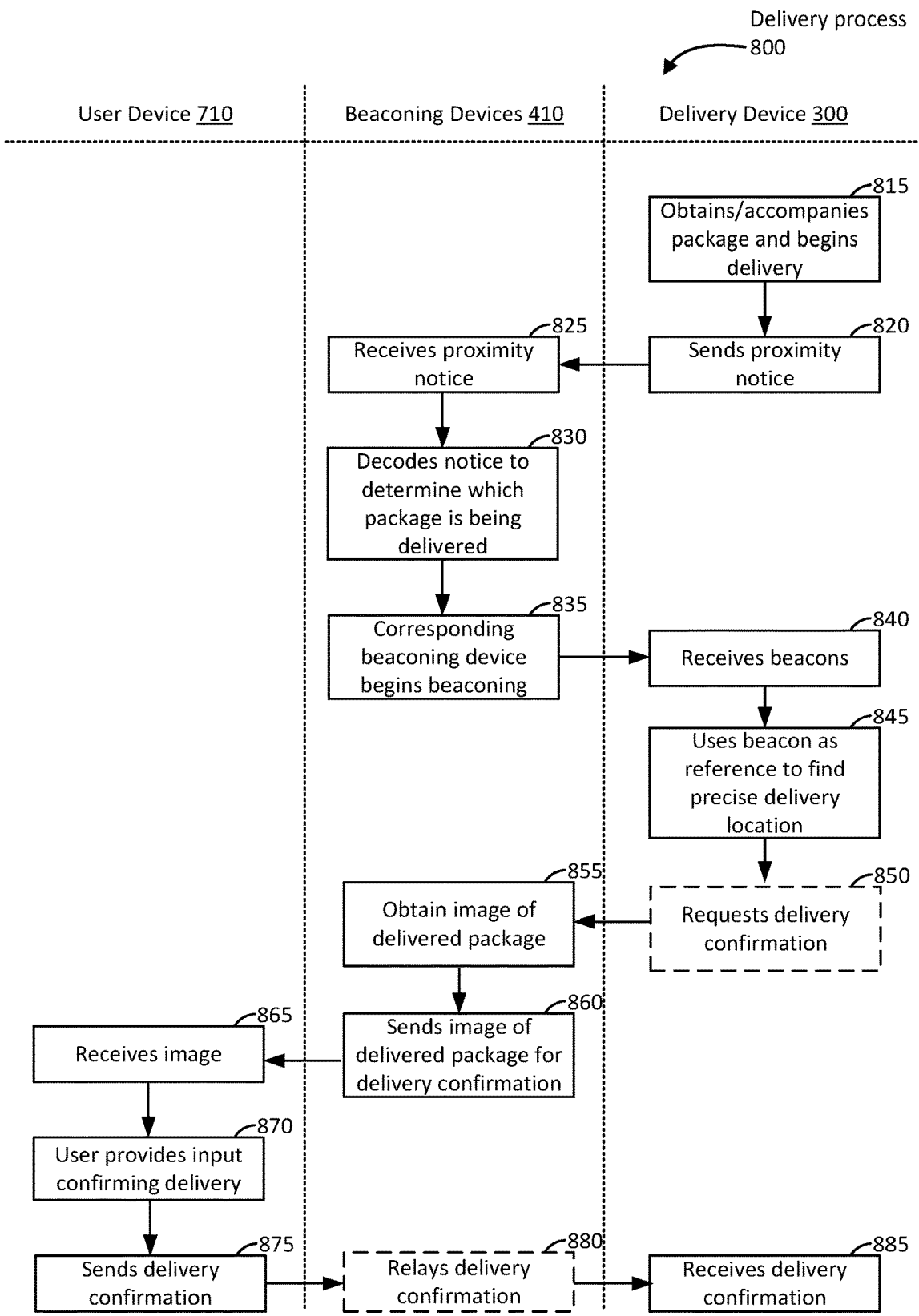

FIG. 8 is a swim lane diagram illustrating a delivery process 800 according to a fifth embodiment. As shown, the functionality of the user device 710, beaconing devices 410, and delivery device 300 may be similar to the functionality of the delivery process 700 illustrated in FIG. 7. For example, the functionality at blocks 815-845 of the delivery process 800 may be similar to the functionality of corresponding blocks 715-745 of the delivery process 700. Here, however, the beaconing devices 410 may be used to obtain the image of the delivered package. That is, rather than the delivery device 300 providing the user device 710 with an image of the delivered package, the delivery device 300 may optionally request delivery confirmation from the beaconing devices 410, as shown at block 850. Alternatively (not shown), the delivery device 300 may simply provide an indication to the beaconing devices 410 that the package has been delivered. In response, the beaconing devices 410 may obtain an image of the delivered package, as shown at block 855. Depending on the functionality of the beaconing devices 410, the beaconing devices 410 themselves may capture the image (e.g., the beaconing devices 410 may comprise a doorbell camera 137 and/or security camera 143). Alternatively, the beaconing devices 410 may obtain an image from one or more different sensors (e.g., one or more cameras communicatively coupled with the beaconing devices 410).

The beaconing devices 410 may then send the image of the delivered package for delivery confirmation, at block 860, to the user device 710. At that point, the remaining part of the delivery process 800, shown at blocks 865-885, may be similar to corresponding functions of the delivery process 700 shown at blocks 760-775. In the delivery process 800 of FIG. 8, however, the beaconing devices 410 may optionally relay the delivery confirmation, at block 880, received from the user device 710 to the delivery device 300.

According to some embodiments, processes similar to those illustrated in FIGS. 7 and 8 may be performed using computer vision (CV) and/or similar techniques to verify delivery to the precise delivery location without user input. Embodiments may comprise comparing one or more images provided by the delivery device 300 with one or more images of the precise delivery location (e.g., previously captured) and/or one or more live images obtained via a camera of the recipient 110. If the image provided by the delivery device 300 matches the image of the precise delivery location (e.g., above a threshold level of confidence determined by the CV functionality), a user device 710, beaconing device 410, or other device performing the comparison may automatically verify proper delivery and provide the delivery confirmation to the delivery device 300, recipient 110, and/or courier service 120. In this manner, the delivery process may not need to wait for user input and can therefore provide immediate (or near-immediate) confirmation to the delivery device 300, which may allow for any correction of the delivery, if needed, as previously described.

According to some embodiments, CV functionality may be implemented via machine learning (ML) algorithms, which may be capable of accurately identifying proper delivery at the precise delivery location after a period of learning (which may involve oversight, at least for an initial period of time, from a human user). According to some embodiments, images used by an ML algorithm may be obtained by a human user (e.g., via a mobile device 135) and provided to the ML algorithm (e.g., executed in the cloud, at the beaconing device 410, etc.) or training the ML algorithm. According to some embodiments, training of an ML algorithm may be transparent to human user. For example, video/images of a precise delivery location can be forwarded to a user for verification that delivery to the precise delivery location has occurred. After a threshold number of video/images have been recorded for various deliveries, an ML algorithm may be trained using the user input for those deliveries. The threshold number of video/images (e.g., positive and/or negative samples for ML training) may be based on the type of ML algorithm used.

According to some embodiments, a beaconing device 410 may be capable of dynamically adapting to issues that may prevent delivery and/or verification of delivery. For example, if a beaconing device 410 uses a camera to determine a triggering event (e.g., identifying a delivery vehicle in the camera's view), but the camera is occluded, the beaconing device 410 may communicate with the delivery device 300 (e.g., indirectly via the Internet) to indicate that the camera is occluded and/or request use of a different triggering event (e.g., request that the delivery device sends a proximity notice). Different such adaptations be implemented depending on the capabilities of the delivery device 300 and/or beaconing device 410.

According to some embodiments, additional functionality may be implemented after delivery has been confirmed/verified. For example, after delivery has been confirmed, sensors (e.g., cameras, RF sensors, motion sensors, etc.) can be configured to detect motion and/or objects at or near the precise delivery location to help detect and optionally prevent theft of the delivered package. According to some embodiments, for example, after confirmation of the delivery has been made, sensors may be configured to operate in a motion-detection mode where an alarm may be triggered if any motion is detected. To help prevent triggering of the alarm by the recipient 110, the recipient may be capable of disarming the alarm and/or disabling the motion-detection mode (e.g., via an app executed on the recipient's mobile device 135) before removing the delivered package. Additionally or alternatively, one or more cameras may be configured to operate in a face-capture mode after confirmation of the package delivery, in which the one or more cameras will identify and capture human faces detected in video/images. This can help identify a potential package thief. Additionally or alternatively, face-capture mode may be used in conjunction with and alarm such that an alarm is triggered if an unrecognized/unauthorized face is detected. However the alarm will not be triggered if a recognized/authorized face is detected.

Figure 9:
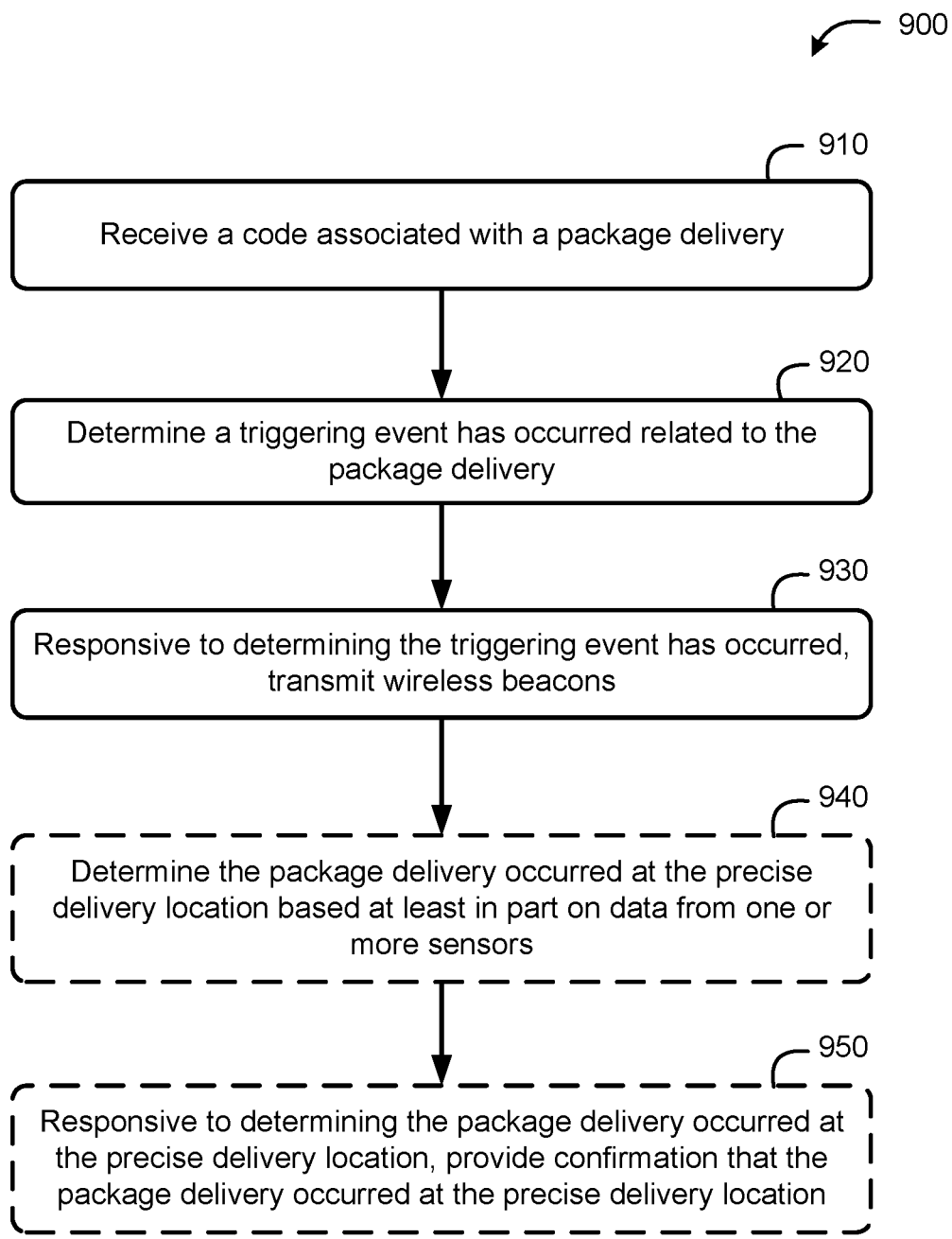
FIG. 9 is a flow diagram of a method of enabling precise package delivery with a beaconing device, according to an embodiment.
Figure 11:
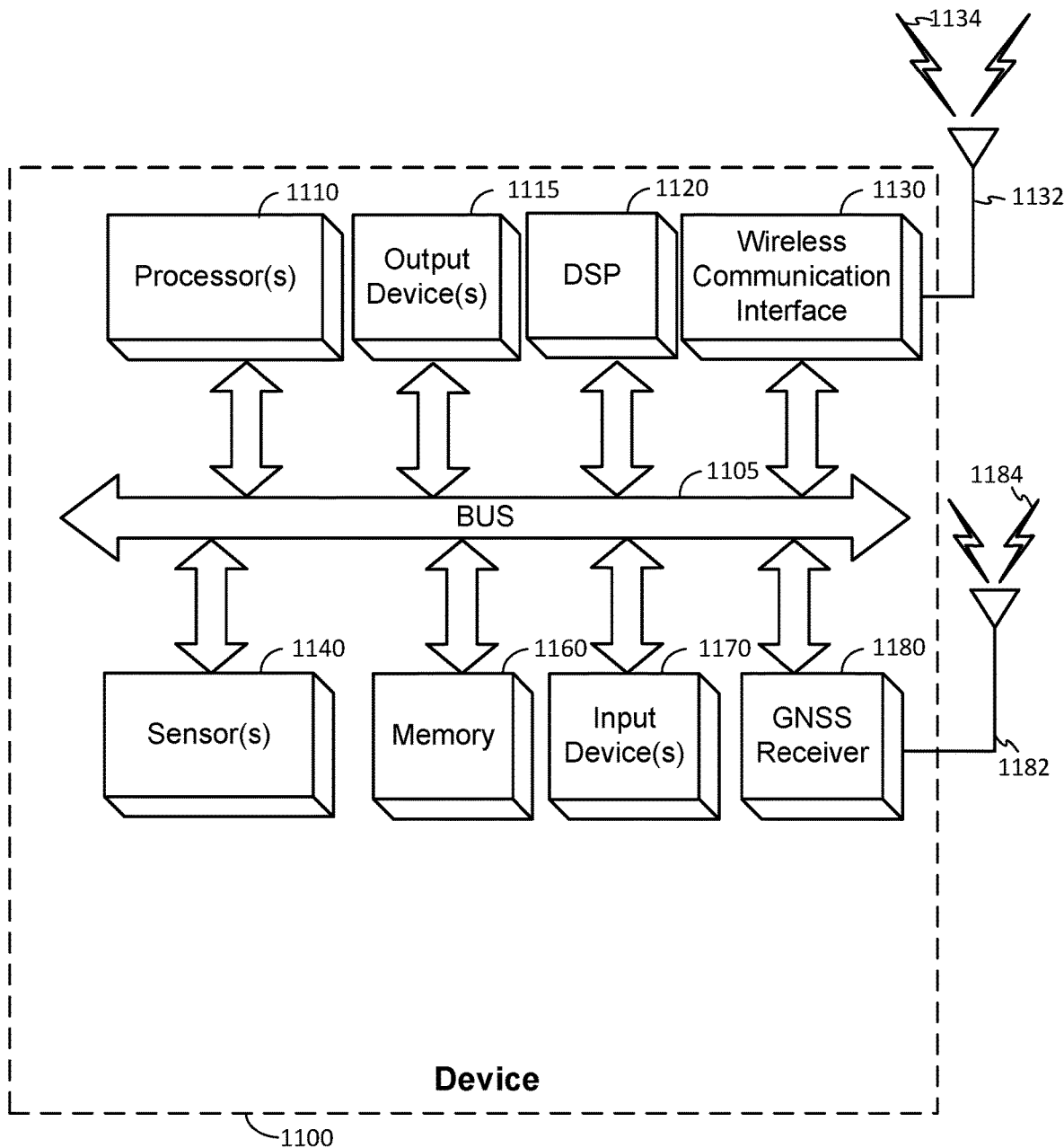
FIG. 11 is a block diagram of a device that may be used as a beaconing device or delivery device, as described herein, according to some embodiments.

FIG. 9 is a flow diagram of a method 900 of enabling precise package delivery with a beaconing device, according to an embodiment. Aspects of the method 900 may correspond to functions illustrated in the embodiments of FIGS. 3-8, described previously, corresponding to the functionality of a beaconing device (e.g., beaconing device 410). As such, means for performing the functionality illustrated in one or more of the blocks shown in FIG. 9 may be performed by hardware and/or software components of a beaconing device. Example components of a device 1100 that may function as a beaconing device are illustrated in FIG. 11 and described in more detail below.

At block 910, the functionality comprises receiving a code associated with a package delivery. As previously noted, the code may be generated by the courier service 120 or merchant 130 and may be unique to the recipient or unique to the package delivery. Further, the code may be received by the beaconing device via the Internet and/or one or more intervening devices communicatively coupled with the beaconing device and courier service 120 (e.g., courier service server 160) or merchant 130 (e.g., merchant server 147). Means for performing functionality at block 910 may comprise bus 1105, processor(s) 1110, wireless communication interface 1130, memory 1160, and/or other components of a device 1100, as illustrated in FIG. 11.

At block 920, the functionality comprises determining a triggering event has occurred, related to the package delivery. As indicated in the previously-described embodiments, triggering events may vary, depending on desired functionality. This can include receiving notice of the proximity of a delivery device, receiving an indication of a time during which the delivery is expected, receiving sensor input indicative of imminent delivery of the package, or the like. According to some embodiments, determining the triggering event has occurred comprises receiving a proximity notice from a delivery device, receiving a time-based notice from the delivery device, or obtaining sensor data indicative of the proximity of the delivery device, or a combination thereof. Means for performing functionality at block 920 may comprise bus 1105, processor(s) 1110, wireless communication interface 1130, sensor(s) 1140, memory 1160, and/or other components of a device 1100, as illustrated in FIG. 11.

At block 930, the functionality comprises responsive to determining the triggering event has occurred, transmitting wireless beacons with the beaconing device. According to some embodiments, an encoding of the wireless beacons may be based at least in part on the code associated with the package delivery. As previously indicated, the wireless beacons may be encoded to include the code and/or may be encrypted based on the code. This can help secure the beacons from potentially being spoofed by other wireless devices, and can help distinguish the beacon (e.g., from other beacons transmitted by other recipients) corresponding to the package delivery. As indicated in the previously-described embodiments, the beaconing device may be one of a plurality of beaconing devices. Moreover, a location of the beaconing device from which the wireless beacons are transmitted can enable package delivery to a precise delivery location comprising an area or volume within which the package is to be delivered. [encoding should not be required—we want to capture an embodiment that does not encode the signals—it should be optional and included in a dependent claim]

Means for performing functionality at block an 930 may comprise bus 1105, processor(s) 1110, wireless communication interface 1130, sensor(s) 1140, memory 1160, and/or other components of a device 1100, as illustrated in FIG. 11.

As previously noted, embodiments may include one or more additional features, depending on desired functionality. As illustrated at blocks 940 and 950 of FIG. 9, this may include confirmation or verification that the delivery has occurred at the precise delivery location. At block 940, for example, the method 900 optionally includes determining the package delivery occurred at the precise delivery location based at least in part on data from one or more sensors. In such embodiments, the method 900 may further comprise, as shown at block 950, responsive to determining the package delivery occurred at the precise delivery location, providing confirmation that the package delivery occurred at the precise delivery location. Depending on desired functionality, providing the confirmation may comprise sending a message indicative of the confirmation to a user device, a delivery device, or a server, or a combination thereof. Additionally or alternatively, the data from the one or more sensors comprises one or more images. In such embodiments, determining the package delivery occurred at the precise delivery location may comprise sending the one or more images to a user device, and receiving, from the user device, data confirming that the package delivery occurred at the precise delivery location. According to some embodiments, determining the package delivery occurred at the precise delivery location may be responsive to receiving a delivery notification from a delivery device. According to some embodiments, the method 900 may further comprise conducting, with the beaconing device, one or more range measurements using wireless signals received from a delivery device. As noted in the previously-described embodiments, this may include RSSI, RTT, and/or FTM measurements, for example. In such embodiments, the method 900 and further include wirelessly sending data indicative of the one or more range measurements to the delivery device.

Figure 10:
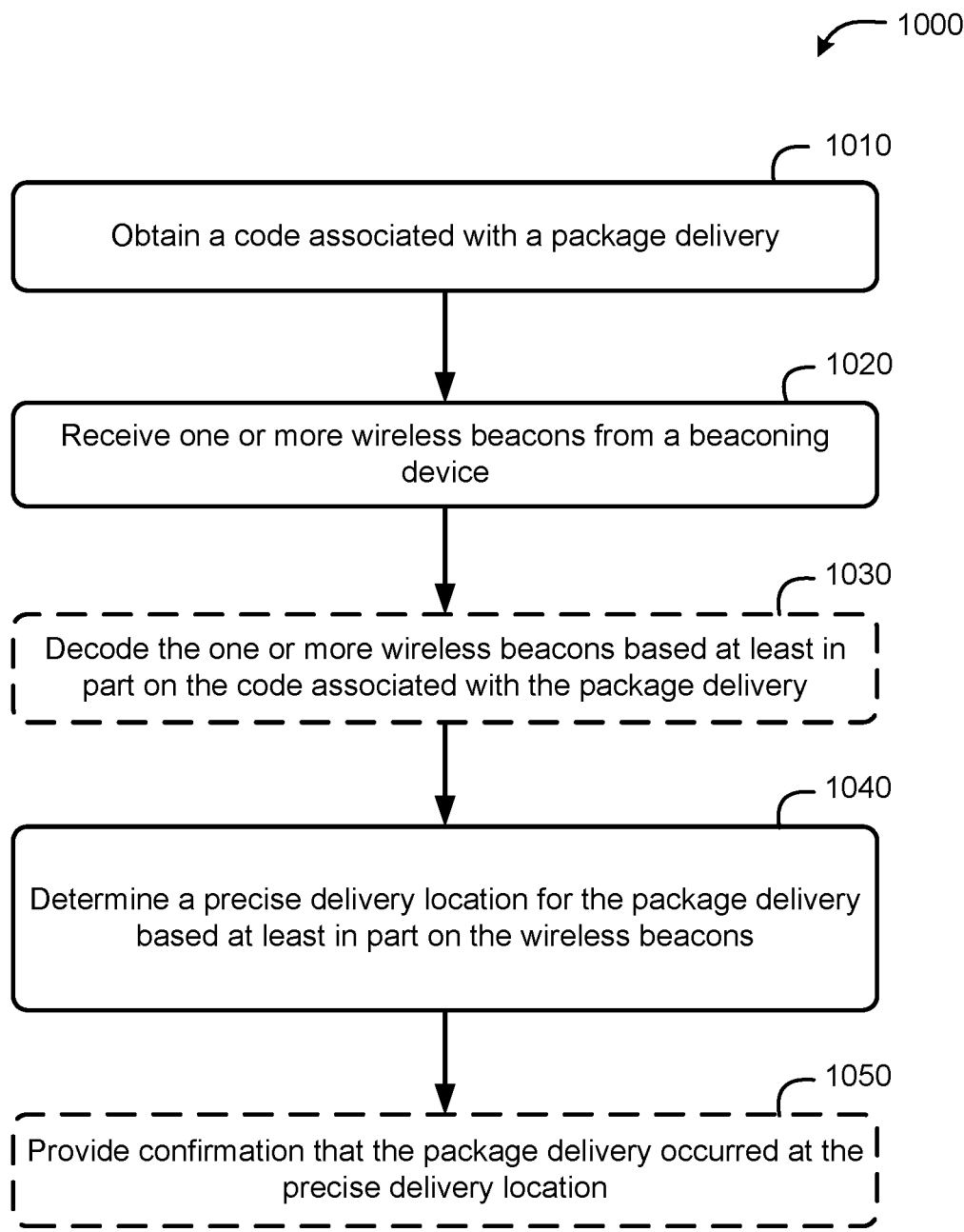
FIG. 10 is a flow diagram of a method of enabling precise package delivery with a beaconing device, according to an embodiment.

FIG. 10 is a flow diagram of a method 1000 of enabling precise package delivery with a beaconing device, according to an embodiment. Aspects of the method 1000 may correspond to functions illustrated in the embodiments of FIGS. 3-8, described previously, corresponding to the functionality of a delivery device (e.g., delivery device 300). As such, means for performing the functionality illustrated in one or more of the blocks shown in FIG. 10 may be performed by hardware and/or software components of a delivery device. Example components of a device 1100 that may function as a delivery device are illustrated in FIG. 11 and described in more detail below.

At block 1010, the functionality comprises obtaining a code associated with a package delivery. As noted previously, the code may be generated by courier service and sent to the delivery device from a courier server 160. Again, the code may be unique to the recipient and/or package delivery, and/or may be based on a password chosen by the recipient. According to some embodiments, the delivery device may be wirelessly coupled with a WAN (e.g., a cellular service such as 4G, 5G, etc.), and may receive the code via a wireless connection with the WAN. Means for performing functionality at block 1010 may comprise bus 1105, processor(s) 1110, wireless communication interface 1130, memory 1160, and/or other components of a device 1100, as illustrated in FIG. 11.

At block 1020, the functionality comprises receiving, at the delivery device, one or more wireless beacons from a beaconing device. Again, wireless beacons may be transmitted using any of a variety of technologies (e.g., Wi-Fi, 4G, 5G, Bluetooth, etc.). Moreover, according to some embodiments, the delivery device may perform measurements such as ranging and/or angular measurements, which may use the beacons and/or other communication with a beaconing device. According to some embodiments, communication between the beaconing device and delivery device may utilized the same wireless technology, or a different wireless technology, then the technology used to transmit the wireless beacons. Means for performing functionality at block 1020 may comprise bus 1105, processor(s) 1110, wireless communication interface 1130, memory 1160, and/or other components of a device 1100, as illustrated in FIG. 11.

At block 1030, which is optional (as indicated by dashed lines), the functionality comprises decoding the one or more wireless beacons based at least in part on the code associated with the package delivery. As noted, to help uniquely identify beacons from the proper recipient, and to help secure the delivery of the package, beacons may be encoded based on the code associated with the package delivery (e.g., the code received at block 1010). According to some embodiments, the encoding may comprise an encryption of the wireless beacons, which may use the code associated with the package delivery as an encryption key or may use the code to generate an encryption key, depending on desired functionality. Additionally or alternatively, the beacons may simply include the code in the beacon for identification purposes. Means for performing functionality at block 1030 may comprise bus 1105, processor(s) 1110, wireless communication interface 1130, memory 1160, and/or other components of a device 1100, as illustrated in FIG. 11.

At block 1040, the functionality comprises determining a precise delivery location for the package delivery based at least in part on the wireless beacons. According to some embodiments, the precise delivery location comprises an area or volume within which the package is to be delivered. As indicated in the previously-described embodiments, instructions and/or other information regarding the precise delivery location may be included in the wireless beacons. As such, according to some embodiments determining the precise delivery location for the package delivery may be further based on information embedded in the one or more wireless beacons. Additionally or alternatively, determining the precise delivery location for the package delivery may comprise obtaining measurements (e.g., ranging and/or angular measurements) of the wireless beacons and/or other RF signals transmitted by the beaconing device. As such, according to some embodiments, the method 1000 may further comprise conducting, with the delivery device, one or more range measurements using wireless signals received from the beaconing device. As noted, this may include conducting RSSI, FTM, and/or RTT measurements, for example. Means for performing functionality at block 1040 may comprise bus 1105, processor(s) 1110, wireless communication interface 1130, memory 1160, and/or other components of a device 1100, as illustrated in FIG. 11.

Some embodiments may include additional operations, depending on desired functionality. As noted in FIG. 10, the method 1000 may optionally include the functionality at block 1050 of providing confirmation that the package delivery occurred at the precise delivery location. This may include, for example, sending a notice that the package delivery occurred at the precise delivery location. The notice may include an image obtained by the delivery device. According to some embodiments, a delivery device may comprise a camera and may take the image. Additionally or alternatively, embodiments may comprise receiving confirmation that the package delivery occurred at the precise delivery location. In such embodiments, the confirmation may be received from the beaconing device.

According to some embodiments, the delivery device may be used to send information to a beaconing device that can be used as a triggering event for initiating the beaconing. For example, as previously noted, some embodiments may comprise sending, to the beaconing device, either or both of a proximity notice or a time-based notice. The proximity notice may comprise a notice that the delivery device and/or a delivery vehicle is within a threshold distance from the delivery location (e.g., the precise delivery location, or the address). The time-based notice may comprise a notice that delivery is expected to occur within a threshold amount of time. This threshold may be established based on relevant factors such as an estimated speed of a delivery vehicle, a number of deliveries/stops (if any) to may be made by the delivery vehicle prior to delivery of the package, a range of a wireless technology used to transmit the beacons, and/or the like.

FIG. 11 illustrates an embodiment of a device 1100, which can be utilized as a mobile device, beaconing device, and/or a delivery device as described herein above (e.g., in association with FIGS. 1-10). For example, the device 1100 can perform one or more of the functions of the methods shown in FIGS. 9-10. It should be noted that FIG. 11 is meant only to provide a generalized illustration of various components, any or all of which may be utilized as appropriate. It can be noted that, in some instances, components illustrated by FIG. 11 can be localized to a single physical device and/or distributed among various networked devices, which may be disposed at different physical locations.

The device 1100 is shown comprising hardware elements that can be electrically coupled via a bus 1105 (or may otherwise be in communication, as appropriate). The hardware elements may include a processor(s) 1110 which can include without limitation one or more general-purpose processors, one or more special-purpose processors (such as digital signal processor (DSP) chips, graphics acceleration processors, application specific integrated circuits (ASICs), and/or the like), and/or other processing structures, units, or means. As shown in FIG. 11, some embodiments may have a separate DSP 1120, depending on desired functionality. Location determination and/or other determinations based on wireless communication may be provided in the processor(s) 1110 and/or wireless communication interface 1130 (discussed below). The device 1100 also can include one or more input devices 1170, which can include without limitation one or more keyboards, touch screens, touch pads, microphones, buttons, dials, switches, and/or the like; and one or more output devices 1115, which can include without limitation one or more displays (e.g., touch screens), light emitting diodes (LEDs), speakers, and/or the like.

The device 1100 may also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the device 1100 to communicate with other devices as described in the embodiments above. The wireless communication interface 1130 may permit data and signaling to be communicated (e.g., transmitted and received) with base stations of a network, for example, via eNBs, gNBs, ng-eNBs, access points, various base stations and/or other access node types, and/or other network components, computer systems, and/or any other electronic devices communicatively coupled with a WAN, as described herein. The communication can be carried out via one or more wireless communication antenna(s) 1132 that send and/or receive wireless signals 1134. According to some embodiments, the wireless communication antenna(s) 1132 may comprise a plurality of discrete antennas, antenna arrays, or any combination thereof. The antenna(s) 1132 may be capable of transmitting and receiving wireless signals using beams (e.g., Tx beams and Rx beams). Beam formation may be performed using digital and/or analog beam formation techniques, with respective digital and/or analog circuitry. The wireless communication interface 1130 may include such circuitry. Additionally, the wireless communication interface 1130 may be used to transmit and/or receive wireless beacons as described herein. This can include, for example, performing ranging and/or angular measurements, including RSSI, FTM, RTT, AoD, AoA, and/or similar measurements/functions.

Depending on desired functionality, the wireless communication interface 1130 may comprise a separate receiver and transmitter, or any combination of transceivers, transmitters, and/or receivers to communicate with base stations (e.g., ng-eNBs and gNBs) and other terrestrial transceivers, such as wireless devices and access points. The device 1100 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, Wideband CDMA (WCDMA), and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The device 1100 can further include sensor(s) 1140. Sensor(s) 1140 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain information for package delivery confirmation/verification as described herein. Additionally or alternatively, the device 1100 may be communicatively coupled to one or more sensors, separate from the device 1100, to obtain information for package delivery confirmation/verification.

Embodiments of the device 1100 may also include a Global Navigation Satellite System (GNSS) receiver 1180 capable of receiving signals 1184 from one or more GNSS satellites using an antenna 1182 (which could be the same as antenna 1132). Positioning based on GNSS signal measurement can be utilized to complement and/or incorporate the techniques described herein. The GNSS receiver 1180 can extract a position of the device 1100, using conventional techniques, from GNSS satellites X110 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1180 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1180 is illustrated in FIG. 11 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1110, DSP 1120, and/or a processor within the wireless communication interface 1130 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 1110 or DSP 1120.

The device 1100 may further include and/or be in communication with a memory 1160. The memory 1160 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1160 of the device 1100 also can comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the device 1100 (and/or processor(s) 1110 or DSP 1120 within device 1100). In an aspect, then such code and/or instructions can be used to configure and/or adapt a general-purpose computer (or other device) to perform one or more operations in accordance with the described methods.

Figure 12:
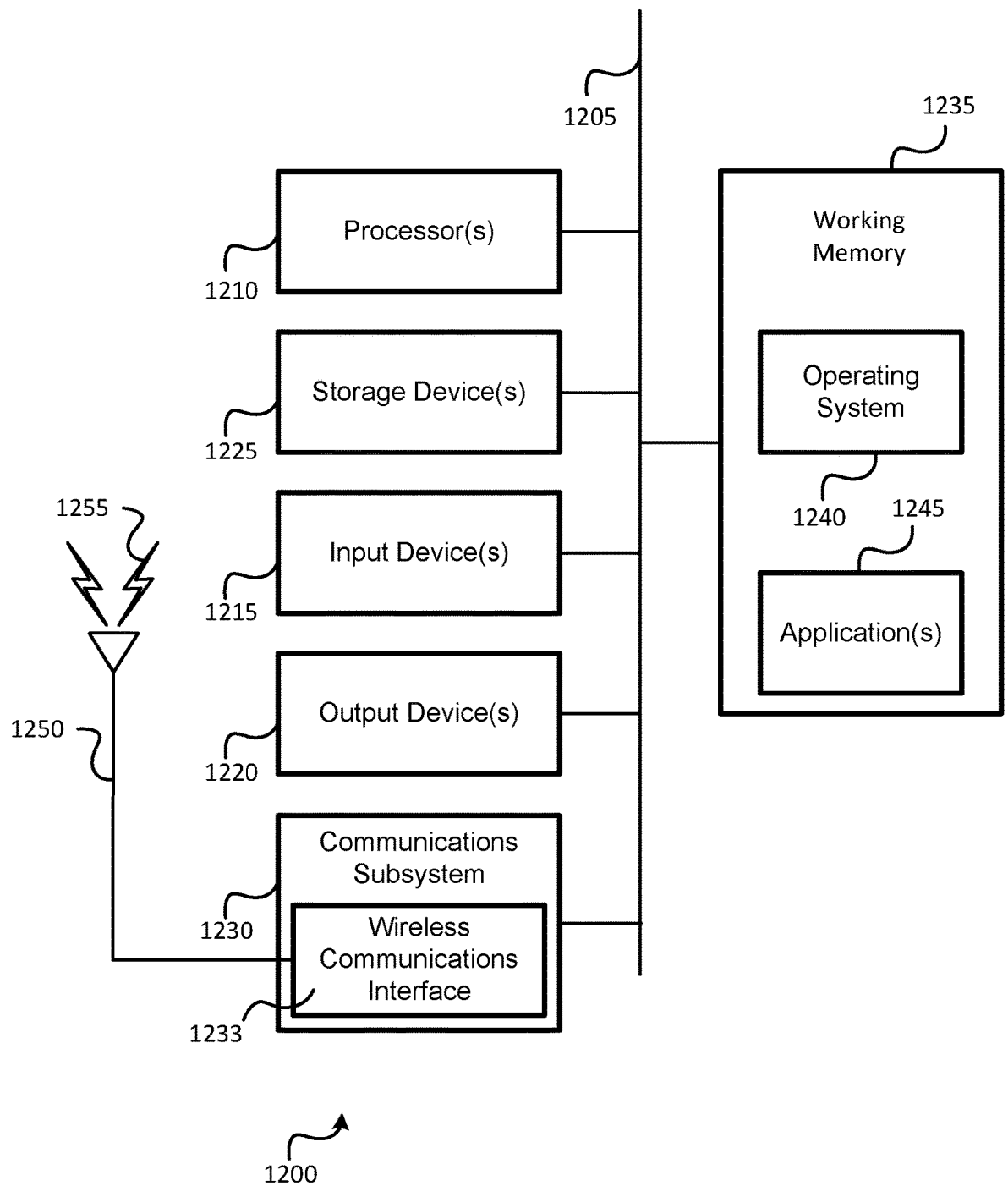
FIG. 12 is a block diagram of an embodiment of a computer system, which can be utilized in embodiments as described herein.

FIG. 12 is a block diagram of an embodiment of a computer system 1200, which may be used, in whole or in part, to provide the functions of a computer or other electronic device as described herein (e.g., merchant server 147, courier service server 160, and/or another device communicatively coupled with the WAN/Internet 133). It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, it can be noted that components illustrated by FIG. 12 can be localized to a single device and/or distributed among various networked devices, which may be disposed at different geographical locations.

The computer system 1200 is shown comprising hardware elements that can be electrically coupled via a bus 1205 (or may otherwise be in communication, as appropriate). The hardware elements may include processor(s) 1210, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1200 also may comprise one or more input devices 1215, which may comprise without limitation a mouse, a keyboard, a camera, a microphone, and/or the like; and one or more output devices 1220, which may comprise without limitation a display device, a printer, and/or the like.

The computer system 1200 may further include (and/or be in communication with) one or more non-transitory storage devices 1225, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1200 may also include a communications subsystem 1230, which may comprise wireless communication technologies managed and controlled by a wireless communication interface 1233, as well as wired technologies (such as Ethernet, coaxial communications, universal serial bus (USB), and the like). The wireless communication interface 1233 may comprise one or more wireless transceivers may send and receive wireless signals 1255 (e.g., beacons and/or RF signals used for wireless communication) via wireless antenna(s) 1250. Thus the communications subsystem 1230 may comprise a modem, a network card (wireless or wired), an infrared communication device, a wireless communication device, and/or a chipset, and/or the like, which may enable the computer system 1200 to communicate on any or all of the communication networks described herein to any device on the respective network, including a User Equipment (UE), base stations and/or other transmission/reception points (TRPs), and/or any other electronic devices described herein. Hence, the communications subsystem 1230 may be used to receive and send data as described in the embodiments herein.

In many embodiments, the computer system 1200 will further comprise a working memory 1235, which may comprise a RAM or ROM device, as described above. Software elements, shown as being located within the working memory 1235, may comprise an operating system 1240, device drivers, executable libraries, and/or other code, such as one or more applications 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of enabling precise package delivery with a beaconing device, the method comprising: receiving a code associated with a package delivery; determining a triggering event has occurred, related to the package delivery; and responsive to determining the triggering event has occurred, transmitting wireless beacons with the beaconing device, wherein an encoding of the wireless beacons is based at least in part on the code associated with the package delivery.

Clause 2. The method of clause 1, further comprising: determining the package delivery occurred at a precise delivery location based at least in part on data from one or more sensors; and responsive to determining the package delivery occurred at the precise delivery location, providing confirmation that the package delivery occurred at the precise delivery location.

Clause 3. The method of clause 2 wherein providing the confirmation comprises sending a message indicative of the confirmation to: a user device, a delivery device, or a server, or a combination thereof.

Clause 4. The method of any of clauses 2-3 wherein the data from the one or more sensors comprises one or more images.

Clause 5. The method of clause 4 wherein determining the package delivery occurred at the precise delivery location comprises: sending the one or more images to a user device; and receiving, from the user device, data confirming that the package delivery occurred at the precise delivery location.

Clause 6. The method of any of clauses 2-5 wherein determining the package delivery occurred at the precise delivery location is responsive to receiving a delivery notification from a delivery device.

Clause 7. The method of any of clauses 1-6 wherein the code is unique to the package delivery.

Clause 8. The method of any of clauses 1-7 wherein determining the triggering event has occurred comprises: receiving a proximity notice from a delivery device, receiving a time-based notice from the delivery device, or obtaining sensor data indicative of a proximity of the delivery device, or a combination thereof.

Clause 9. The method of any of clauses 1-8 further comprising conducting, with the beaconing device, one or more range measurements using wireless signals received from a delivery device.

Clause 10. The method of clause 9 further comprising wirelessly sending data indicative of the one or more range measurements to the delivery device.

Clause 11. A method of enabling precise package delivery with a delivery device, the method comprising: obtaining a code associated with a package delivery; receiving, at the delivery device, one or more wireless beacons from a beaconing device; decoding, with the delivery device, the one or more wireless beacons based at least in part on the code associated with the package delivery; and determining a precise delivery location for the package delivery based at least in part on the wireless beacons, wherein the precise delivery location comprises an area or volume within which a package is to be delivered.

Clause 12. The method of clause 11, further comprising sending a notice that the package delivery occurred at the precise delivery location.

Clause 13. The method of any of clauses 11-12 further comprising receiving confirmation that the package delivery occurred at the precise delivery location.

Clause 14. The method of clause 13 wherein the confirmation is received from the beaconing device.

Clause 15. The method of any of clauses 11-14 wherein the code is unique to the package delivery.

Clause 16. The method of any of clauses 11-15 further comprising sending, to the beaconing device, either or both of a proximity notice or a time-based notice.

Clause 17. The method of any of clauses 11-16 wherein determining the precise delivery location for the package delivery further based on information embedded in the one or more wireless beacons.

Clause 18. The method of any of clauses 11-17 further comprising conducting, with the delivery device, one or more range measurements using wireless signals received from the beaconing device.

Clause 19. A beaconing device for enabling precise package delivery, the beaconing device comprising: a transceiver; a memory; and one or more processors communicatively coupled with the transceiver and the memory, wherein the one or more processors are configured to: receive a code associated with a package delivery; determine a triggering event has occurred, related to the package delivery; and responsive to determining the triggering event has occurred, transmitting wireless beacons via the transceiver, wherein an encoding of the wireless beacons is based at least in part on the code associated with the package delivery.

Clause 20. The beaconing device of clause 19, wherein the one or more processors are further configured to: determine the package delivery occurred at a precise delivery location based at least in part on data from one or more sensors; and responsive to determining the package delivery occurred at the precise delivery location, provide confirmation that the package delivery occurred at the precise delivery location.

Clause 21. The beaconing device of clause 20 wherein, to provide the confirmation, the one or more processors are configured to send a message indicative of the confirmation to a user device, a delivery device, or a server, or a combination thereof.

Clause 22. The beaconing device of any of clauses 20-21 wherein the data from the one or more sensors comprises one or more images.

Clause 23. The beaconing device of clause 22 wherein, to determine the package delivery occurred at the precise delivery location, the one or more processors are configured to send the one or more images to a user device; and receive, from the user device, data confirming that the package delivery occurred at the precise delivery location.

Clause 24. The beaconing device of any of clauses 20-23 wherein the one or more processors are configured to determine the package delivery occurred at the precise delivery location responsive to receiving a delivery notification from a delivery device.

Clause 25. The beaconing device of any of clauses 19-24 wherein the code is unique to the package delivery.

Clause 26. The beaconing device of any of clauses 19-25 wherein, to determine the triggering event has occurred, the one or more processors are configured to receive a proximity notice from a delivery device, receive a time-based notice from the delivery device, or obtain sensor data indicative of a proximity of the delivery device, or a combination thereof.

Clause 27. The beaconing device of any of clauses 19-26 wherein the one or more processors are further configured to conduct, via the transceiver, one or more range measurements using wireless signals received from a delivery device.

Clause 28. The beaconing device of clause 27 wherein the one or more processors are further configured to wirelessly send data indicative of the one or more range measurements to the delivery device.

Clause 29. A delivery device for enabling precise package delivery, the delivery device comprising: a transceiver; a memory; and one or more processors communicatively coupled with the transceiver and the memory, wherein the one or more processors are configured to: obtain a code associated with a package delivery; receive, via the transceiver, one or more wireless beacons from a beaconing device; decode the one or more wireless beacons based at least in part on the code associated with the package delivery; and determine a precise delivery location for the package delivery based at least in part on the wireless beacons, wherein the precise delivery location comprises an area or volume within which a package is to be delivered.

Clause 30. The delivery device of clause 29, wherein the one or more processors are further configured to send a notice that the package delivery occurred at the precise delivery location.

Clause 31. The delivery device of any of clauses 29-30 wherein the one or more processors are further configured to receive confirmation that the package delivery occurred at the precise delivery location.

Clause 32. The delivery device of clause 31 wherein the one or more processors are configured to receive the confirmation from the beaconing device.

Clause 33. The delivery device of any of clauses 29-32 wherein the code is unique to the package delivery.

Clause 34. The delivery device of any of clauses 29-33 wherein the one or more processors are further configured to send, to the beaconing device, either or both of a proximity notice or a time-based notice.

Clause 35. The delivery device of any of clauses 29-34 wherein the one or more processors are further configured to determine the precise delivery location for the package delivery further based on information embedded in the one or more wireless beacons.

Clause 36. The delivery device of any of clauses 29-35 wherein the one or more processors are further configured to conduct, using the transceiver, one or more range measurements using wireless signals received from the beaconing device.

Clause 37. An apparatus having means for performing the method of any one of claims 1-18.

Clause 38. A non-transitory computer-readable medium storing instructions comprising code for performing the method of any one of claims 1-18.

What is claimed is:

1. A method of enabling precise package delivery with a beaconing device, the method comprising:
   receiving a code associated with a package delivery, wherein the code associated with the package delivery is unique to either or both of the package delivery or a recipient of the package;
   determining a triggering event has occurred, related to the package delivery; and
   responsive to determining the triggering event has occurred, automatically transmitting wireless beacons with the beaconing device to guide a delivery device to a precise delivery location with the wireless beacons, wherein automatically transmitting the wireless beacons comprises encrypting the wireless beacons, and wherein the encrypting includes:
   using the code associated with the package delivery as an encryption key, or
   using the code associated with the package delivery to generate an encryption key.

2. The method of claim 1, further comprising:
   determining the package delivery occurred at a precise delivery location based at least in part on data from one or more sensors sensing delivery of the package at the precise delivery location; and
   responsive to determining the package delivery occurred at the precise delivery location, providing confirmation that the package delivery occurred at the precise delivery location.

3. The method of claim 2, wherein providing the confirmation comprises sending a message indicative of the confirmation to:
   a user device,
   the delivery device, or
   a server, or
   a combination thereof.

4. The method of claim 2, wherein the data from the one or more sensors comprises one or more images.

5. The method of claim 4, wherein determining the package delivery occurred at the precise delivery location comprises:
   sending the one or more images to a user device; and
   receiving, from the user device, data confirming that the package delivery occurred at the precise delivery location.

6. The method of claim 2, wherein determining the package delivery occurred at the precise delivery location is responsive to receiving a delivery notification from the delivery device.

7. The method of claim 1, wherein determining the triggering event has occurred comprises:
   receiving a proximity notice from the delivery device,
   receiving a time-based notice from the delivery device, or
   obtaining sensor data indicative of a proximity of the delivery device, or
   a combination thereof.

8. The method of claim 1, further comprising conducting, with the beaconing device, one or more range measurements using wireless signals received from the delivery device.

9. The method of claim 8, further comprising wirelessly sending data indicative of the one or more range measurements to the delivery device.

10. The method of claim 1, wherein the precise delivery location for the package delivery is one of a plurality of available precise delivery locations at a delivery site.

11. The method of claim 10, wherein transmitting the wireless beacons comprises activating the beaconing device corresponding to the precise delivery location for the package delivery.

12. The method of claim 11, wherein activating the beaconing device is performed by a hub in communication with a plurality of beaconing devices corresponding to the plurality of available precise delivery locations.

13. The method of claim 2, wherein the data from the one or more sensors comprises identifying information obtained from the package.

14. The method of claim 13, wherein the identifying information is obtained from a radio frequency identifier (RFID) in or on the package.

15. The method of claim 13, wherein the identifying information is obtained from a barcode or quick response (QR) code on the package.

16. A method of enabling precise package delivery with a delivery device, the method comprising:
obtaining a code associated with a package delivery, wherein the code associated with the package delivery is unique to either or both of the package delivery or a recipient of the package;
receiving, at the delivery device, one or more wireless beacons from a beaconing device;
decrypting the wireless beacons, wherein the decrypting includes:
using the code associated with the package delivery as a decryption key, or
using the code associated with the package delivery to generate a decryption key; and
determining a precise delivery location for the package delivery based at least in part on the decrypted wireless beacons.

17. The method of claim 16, wherein the precise delivery location comprises an area or volume within which a package is to be delivered.

18. The method of claim 16, further comprising sending a notice that the package delivery occurred at the precise delivery location.

19. The method of claim 16, further comprising receiving confirmation that the package delivery occurred at the precise delivery location.

20. The method of claim 19, wherein the confirmation is received from the beaconing device.

21. The method of claim 16, further comprising sending, to the beaconing device, either or both of a proximity notice or a time-based notice.

22. The method of claim 16, wherein determining the precise delivery location for the package delivery further based on delivery instructions embedded in the one or more wireless beacons.

23. The method of claim 16, further comprising conducting, with the delivery device, one or more range measurements using wireless signals received from the beaconing device.

24. A beaconing device for enabling precise package delivery, the beaconing device comprising:
a transceiver;
a memory; and
one or more processors communicatively coupled with the transceiver and the memory, wherein the one or more processors are configured to:
receive a code associated with a package delivery, wherein the code associated with the package delivery is unique to either or both of the package delivery or a recipient of the package;
determine a triggering event has occurred, related to the package delivery; and
responsive to determining the triggering event has occurred, automatically transmitting wireless beacons via the transceiver to guide a delivery device to a precise delivery location with the wireless beacons, wherein, to automatically transmit the wireless beacons, the one or more processors are configured to include, in the wireless beacons, encrypted delivery instructions regarding a precise delivery location for the package delivery.

25. The beaconing device of claim 24, wherein the one or more processors are further configured to:
determine the package delivery occurred at a precise delivery location based at least in part on data from one or more sensors sensing delivery of the package at the precise delivery location; and
responsive to determining the package delivery occurred at the precise delivery location, provide confirmation that the package delivery occurred at the precise delivery location.

26. The beaconing device of claim 25, wherein, to provide the confirmation, the one or more processors are configured to send a message indicative of the confirmation to:
a user device,
the delivery device, or
a server, or
a combination thereof.

27. The beaconing device of claim 25, wherein the data from the one or more sensors comprises one or more images.

28. The beaconing device of claim 27, wherein, to determine the package delivery occurred at the precise delivery location, the one or more processors are configured to:
send the one or more images to a user device; and
receive, from the user device, data confirming that the package delivery occurred at the precise delivery location.

29. The beaconing device of claim 25, wherein the one or more processors are configured to determine the package delivery occurred at the precise delivery location responsive to receiving a delivery notification from the delivery device.

30. The beaconing device of claim 24, wherein, to determine the triggering event has occurred, the one or more processors are configured to:
receive a proximity notice from the delivery device,
receive a time-based notice from the delivery device, or
obtain sensor data indicative of a proximity of the delivery device, or
a combination thereof.

31. The beaconing device of claim 24, wherein the one or more processors are further configured to conduct, via the transceiver, one or more range measurements using wireless signals received from the delivery device.

32. The beaconing device of claim 31, wherein the one or more processors are further configured to wirelessly send data indicative of the one or more range measurements to the delivery device.

33. A delivery device for enabling precise package delivery, the delivery device comprising:
a transceiver;
a memory; and
one or more processors communicatively coupled with the transceiver and the memory, wherein the one or more processors are configured to:
obtain a code associated with a package delivery, wherein the code associated with the package delivery is unique to either or both of the package delivery or a recipient of the package;
receive, via the transceiver, one or more wireless beacons from a beaconing device wherein the one or more wireless beacons include delivery instructions regarding a precise delivery location for the package delivery;
decrypt the wireless beacons based at least in part on the code associated with the package delivery; and
determine a precise delivery location for the package delivery based at least in part on the delivery instructions regarding the precise delivery location for the package delivery included in the decrypted wireless beacons.

34. The delivery device of claim 33, wherein, to determine the precise delivery location, the one or more processors are configured to determine an area or volume within which a package is to be delivered.

35. The delivery device of claim 33, wherein the one or more processors are further configured to send a notice that the package delivery occurred at the precise delivery location.

36. The delivery device of claim 33, wherein the one or more processors are further configured to receive confirmation that the package delivery occurred at the precise delivery location.

37. The delivery device of claim 36, wherein the one or more processors are configured to receive the confirmation from the beaconing device.

38. The delivery device of claim 33, wherein the one or more processors are further configured to send, to the beaconing device, either or both of a proximity notice or a time-based notice.

39. The delivery device of claim 33, wherein the one or more processors are further configured to conduct, using the transceiver, one or more range measurements using wireless signals received from the beaconing device.

40. A beaconing device for enabling precise package delivery, the beaconing device comprising:
means for receiving a code associated with a package delivery, wherein the code associated with the package delivery is unique to either or both of the package delivery or a recipient of the package;
means for determining a triggering event has occurred, related to the package delivery; and
means for automatically transmitting wireless beacons with the beaconing device responsive to determining the triggering event has occurred, to guide a delivery device to a precise delivery location with the wireless beacons, wherein the means for automatically transmitting the wireless beacons include means for performing one or more measurements of a range between the beaconing device and the delivery device using wireless signals from the beaconing device.

41. The beaconing device of claim 40, further comprising:
means for determining the package delivery occurred at a precise delivery location based at least in part on data from one or more sensors sensing delivery of the package at the precise delivery location; and
means for, responsive to determining the package delivery occurred at the precise delivery location, providing confirmation that the package delivery occurred at the precise delivery location.

42. A delivery device for enabling precise package delivery, the delivery device comprising:
means for obtaining a code associated with a package delivery, wherein the code associated with the package delivery is unique to either or both of the package delivery or a recipient of the package;
means for receiving one or more wireless beacons from a beaconing device;
means for decrypting the wireless beacons based at least in part on the code associated with the package delivery;
means for performing one or more measurements of a range between the beaconing device and the delivery device using wireless signals from the beaconing device; and
means for determining a precise delivery location for the package delivery based at least in part on the one or more wireless measurements.

43. A non-transitory computer-readable medium storing instructions for enabling precise package delivery with a beaconing device, the instructions comprising code for:
receiving a code associated with a package delivery, wherein the code associated with the package delivery is unique to either or both of the package delivery or a recipient of the package;
determining a triggering event has occurred, related to the package delivery; and
responsive to determining the triggering event has occurred, automatically transmitting wireless beacons with the beaconing device to guide a delivery device to a precise delivery location with the wireless beacons, wherein the code for automatically transmitting wireless beacons comprises code for encrypting the wireless beacons, and wherein the code for encrypting the wireless beacons includes code for:
using the code associated with the package delivery as an encryption key, or
using the code associated with the package delivery to generate an encryption key.

44. The non-transitory computer-readable medium of claim 43, wherein the instructions further comprise code for:
determining the package delivery occurred at a precise delivery location based at least in part on data from one or more sensors sensing delivery of the package at the precise delivery location; and
responsive to determining the package delivery occurred at the precise delivery location, providing confirmation that the package delivery occurred at the precise delivery location.

45. A non-transitory computer-readable medium storing instructions for enabling precise package delivery with a delivery device, the instructions comprising code for:
obtaining a code associated with a package delivery, wherein the code associated with the package delivery is unique to either or both of the package delivery or a recipient of the package;
receiving, at the delivery device, one or more wireless beacons from a beaconing device;
decrypting the wireless beacons based at least in part on the code associated with the package delivery, wherein the code for decrypting the wireless beacons comprises code for:
using the code associated with the package delivery as a decryption key, or
using the code associated with the package delivery to generate a decryption key; and
determining a precise delivery location for the package delivery based at least in part on the wireless beacons.

* * * * *